(12) United States Patent
Kang et al.

(10) Patent No.: US 12,532,469 B2
(45) Date of Patent: Jan. 20, 2026

(54) SEMICONDUCTOR MEMORY DEVICE AND ELECTRONIC SYSTEM INCLUDING THE SAME

(71) Applicant: Samsung Electronics Co., Ltd., Suwon-si (KR)

(72) Inventors: Min Gu Kang, Hwaseong-si (KR); Sang Don Zoo, Hwaseong-si (KR); Joon Sung Kim, Seoul (KR); Junghwan Park, Hwaseong-si (KR); Seorim Moon, Seoul (KR); Seok Cheon Baek, Hwaseong-si (KR); Cheol Ryou, Hwaseong-si (KR); Sun Young Lee, Hwaseong-si (KR); Cheol-Min Lim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 712 days.

(21) Appl. No.: 17/884,853

(22) Filed: Aug. 10, 2022

(65) Prior Publication Data
US 2023/0189524 A1 Jun. 15, 2023

(30) Foreign Application Priority Data
Dec. 13, 2021 (KR) .......... 10-2021-0177370

(51) Int. Cl.
*H10B 43/27* (2023.01)
*H01L 23/535* (2006.01)

(52) U.S. Cl.
CPC .......... *H10B 43/27* (2023.02); *H01L 23/535* (2013.01)

(58) Field of Classification Search
CPC ........ H10B 43/27; H10B 43/10; H10B 43/50; H10B 43/00; H10B 43/40; H01L 23/525
See application file for complete search history.

(56) References Cited

U.S. PATENT DOCUMENTS

| | | | |
|---|---|---|---|
| 9,425,205 B2 | 8/2016 | Shimura | |
| 9,508,730 B2 | 11/2016 | Lee et al. | |
| 9,922,992 B1 * | 3/2018 | Yu | H10B 41/27 |
| 2016/0268263 A1 * | 9/2016 | Lee | H10B 43/10 |
| 2017/0373087 A1 * | 12/2017 | Ito | H10B 43/40 |

(Continued)

FOREIGN PATENT DOCUMENTS

CN 112786608 A 5/2021

*Primary Examiner* — Galina G Yushina
(74) *Attorney, Agent, or Firm* — HARNESS, DICKEY & PIERCE, P.L.C.

(57) ABSTRACT

A semiconductor memory device may include a substrate including a first and a second block region, and a stacked structure including insulating films and gate electrodes alternately stacked on the substrate. A vertical channel structure, a word line cut structure, and a block cut structure may penetrate the stacked structure. The word line cut structure may extend in a second direction. The block cut structure may extend in a first direction, connect to the word line cut structure, and define the first and second block regions. The block cut structure may include a first portion connected to the word line cut structure and a second portion connected to the first portion. From a planar viewpoint, the first portion may include at least a part not overlapping the second portion in the first direction and at least a region not overlapping the word line cut structure in the first direction.

20 Claims, 23 Drawing Sheets

(56) References Cited

U.S. PATENT DOCUMENTS

| | | | |
|---|---|---|---|
| 2018/0277565 A1* | 9/2018 | Futatsuyama | G11C 16/26 |
| 2019/0371811 A1* | 12/2019 | Oike | H01L 23/528 |
| 2021/0074711 A1* | 3/2021 | Suzuki | G11C 16/0483 |
| 2021/0384210 A1* | 12/2021 | Jo | H10B 41/40 |
| 2022/0093643 A1* | 3/2022 | Sakamoto | G11C 5/063 |
| 2023/0033311 A1* | 2/2023 | Yang | H10B 43/10 |

* cited by examiner

SEMICONDUCTOR MEMORY DEVICE AND ELECTRONIC SYSTEM INCLUDING THE SAME

CROSS-REFERENCE TO RELATED APPLICATION

This application claims priority from Korean Patent Application No. 10-2021-0177370 filed on Dec. 13, 2021 in the Korean Intellectual Property Office, and all the benefits accruing therefrom under 35 U.S.C. 119, the contents of which in its entirety are herein incorporated by reference.

BACKGROUND

1. Field of the Disclosure

The present disclosure relates to a semiconductor memory device and/or an electronic system including the same.

2. Description of the Related Art

Increasing the degree of integration of semiconductor memory devices may be needed to satisfy excellent performance and low price required by consumers. In the case of the semiconductor memory device, because the degree of integration is an important factor in determining the price of a product, an increased degree of integration particularly may be required. In the case of a two-dimensional or planar semiconductor memory device, the degree of integration is mainly determined by an area occupied by unit memory cells, and is therefore greatly affected by the level of fine pattern forming technology.

However, since ultra-expensive apparatuses may be required to miniaturize the pattern, the degree of integration of the two-dimensional semiconductor memory device is increasing, but it is still limited. Accordingly, three-dimensional semiconductor memory devices including memory cells arranged three-dimensionally have been proposed.

SUMMARY

Aspects of the present disclosure provide a semiconductor memory device having improved reliability.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an example embodiment of the present disclosure, a semiconductor memory device may include a substrate including a first block region and a second block region; and a stacked structure including a plurality of inter-electrode insulating films and a plurality of gate electrodes extending in a first direction and alternately stacked on the substrate. The stacked structure may include a vertical channel structure, a word line cut structure, and a block cut structure each penetrating the stacked structure. The word line cut structure may extend in a second direction intersecting the first direction. The block cut structure may extend in the first direction and may be connected to the word line cut structure. The block cut structure may define the first block region and the second block region. The block cut structure may include a first portion connected to the word line cut structure and a second portion connected to the first portion. At least a part of the first portion may not overlap the second portion in the first direction from a planar viewpoint. At least a region of the first portion may not overlap the word line cut structure in the first direction from the planar viewpoint.

According to an example embodiment of the present disclosure, a semiconductor memory device may include a substrate including a first block region and a second block region; and a stacked structure including a plurality of inter-electrode insulating films and a plurality of gate electrodes extending in a first direction and alternately stacked on the substrate. The stacked structure may include a vertical channel structure, a first cut structure, and a block cut structure each penetrating the stacked structure. The first cut structure may be spaced apart from the vertical channel structure. The first cut structure may include a first word line cut structure and a first block cut structure. The first word line cut structure may extend in a second direction intersecting the first direction. The first block cut structure may extend in the first direction and may be connected to the first word line cut structure. The first block cut structure may define the first block region and the second block region. From a planar viewpoint, the first cut structure may have a 'Y' shape in a first region in which the first word line cut structure and the first block cut structure intersect.

According to an example embodiment of the present disclosure, an electronic system may include a main board, a semiconductor memory device on the main board, and a controller electrically connected to the semiconductor memory device on the main board. The semiconductor memory device may include a substrate, a stacked structure, and a vertical channel structure, a word line cut structure, and a block cut structure. The substrate may include a first block region and a second block region. The stacked structure may include a plurality of inter-electrode insulating films and a plurality of gate electrodes extending in a first direction and alternately stacked on the substrate. The vertical channel structure may penetrate the stacked structure. The word line cut structure may extend in a second direction intersecting the first direction and may penetrate the stacked structure. The block cut structure may extend in the first direction, penetrate the stacked structure, and may be connected to the word line cut structure. The block cut structure may define the first block region and the second block region. The block cut structure may include a first portion connected to the word line cut structure and a second portion connected to the first portion. At least a part of the first portion may not overlap the second portion in the first direction from a planar viewpoint. At least a region of the first portion may not overlap the word line cut structure in the first direction from the planar viewpoint.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Hereinafter, example embodiments of the present disclosure will be described referring to the accompanying drawings.

Figure 1:
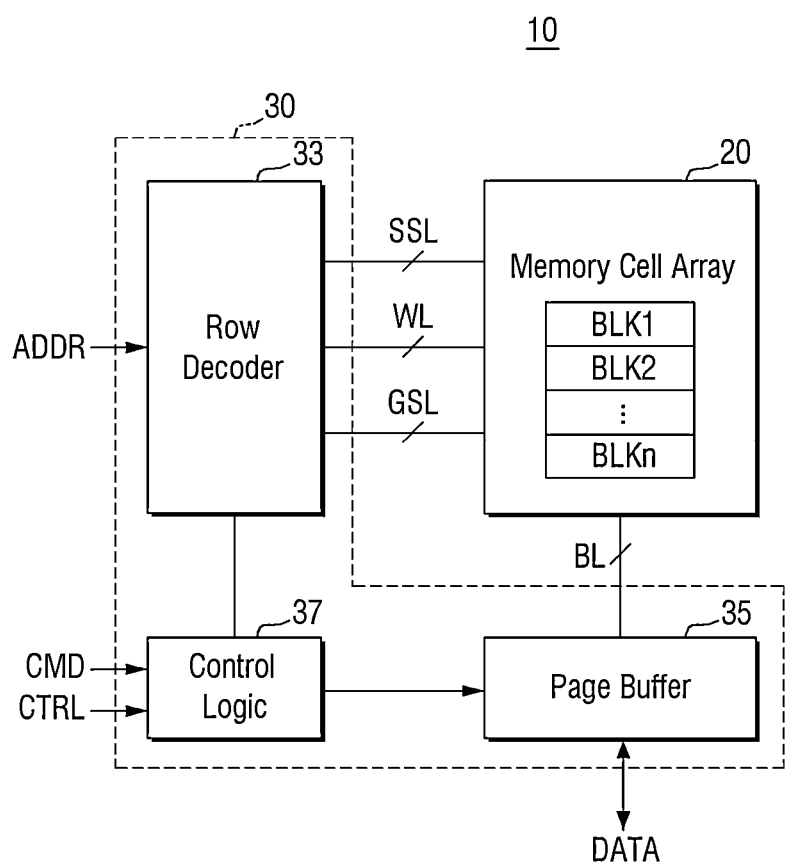
FIG. 1 is an example block diagram of a semiconductor memory device according to some embodiments of the present disclosure.

FIG. 1 is an example block diagram of a semiconductor memory device according to some embodiments of the present disclosure.

Referring to FIG. 1, a semiconductor memory device 10 according to some embodiments may include a memory cell array 20 and a peripheral circuit 30.

The memory cell array 20 may include a plurality of memory cell blocks BLK1 to BLKn. Each of the memory cell blocks BLK1 to BLKn may include a plurality of memory cells. The memory cell blocks BLK1 to BLKn may be connected to the peripheral circuit 30 through bit lines BL, word lines WL, at least one string selection line SSL, and at least one ground selection line GSL.

Specifically, the memory cell blocks BLK1 to BLKn may be connected to a row decoder 33 through the word lines WL, at least one string selection line SSL, and at least one ground selection line GSL. Further, the memory cell blocks BLK1 to BLKn may be connected to a page buffer 35 through the bit lines BL.

The peripheral circuit 30 may receive an address ADDR, a command CMD, and a control signal CTRL from the outside of the semiconductor memory device 10, and may transmit and receive data DATA to and from an external device of the semiconductor memory device 10. The peripheral circuit 30 may include a control logic 37, a row decoder 33, and a page buffer 35.

Although not shown, the peripheral circuit 30 may further include various sub-circuits such as an input/output circuit, a voltage generation circuit that generates various voltages necessary for the operation of the semiconductor memory device 10, and an error correction circuit for correcting an error of the data DATA that is read from the memory cell array 20.

The control logic 37 may be connected to the row decoder 33, the input/output circuit, and the voltage generation circuit. The control logic 37 may control the overall operation of the semiconductor memory device 10. The control logic 37 may generate various internal control signals used inside the semiconductor memory device 10 in response to the control signal CTRL. For example, the control logic 37 may adjust the voltage levels provided to the word lines WL and the bit lines BL when performing a memory operation such as a program operation or an erase operation.

The row decoder 33 may select at least one of the plurality of memory cell blocks BLK1 to BLKn in response to the address ADDR, and may select at least one word line WL, at least one string selection line SSL, and at least one ground selection line GSL of the selected memory cell blocks BLK1 to BLKn. The row decoder 33 may transmit a voltage for performing the memory operation to the word line WL of the selected memory cell blocks BLK1 to BLKn.

The page buffer 35 may be connected to the memory cell array 20 through the bit lines BL. The page buffer 35 may operate as a writer driver or a sense amplifier. Specifically, at the time of the program operation, the page buffer 35 may operates as the writer driver to apply a voltage according to the data DATA to be stored in the memory cell array 20 to the bit lines BL. On the other hand, at the time of the read operation, the page buffer 35 may operate as a sense amplifier to sense the data DATA stored in the memory cell array 20.

Figure 2:
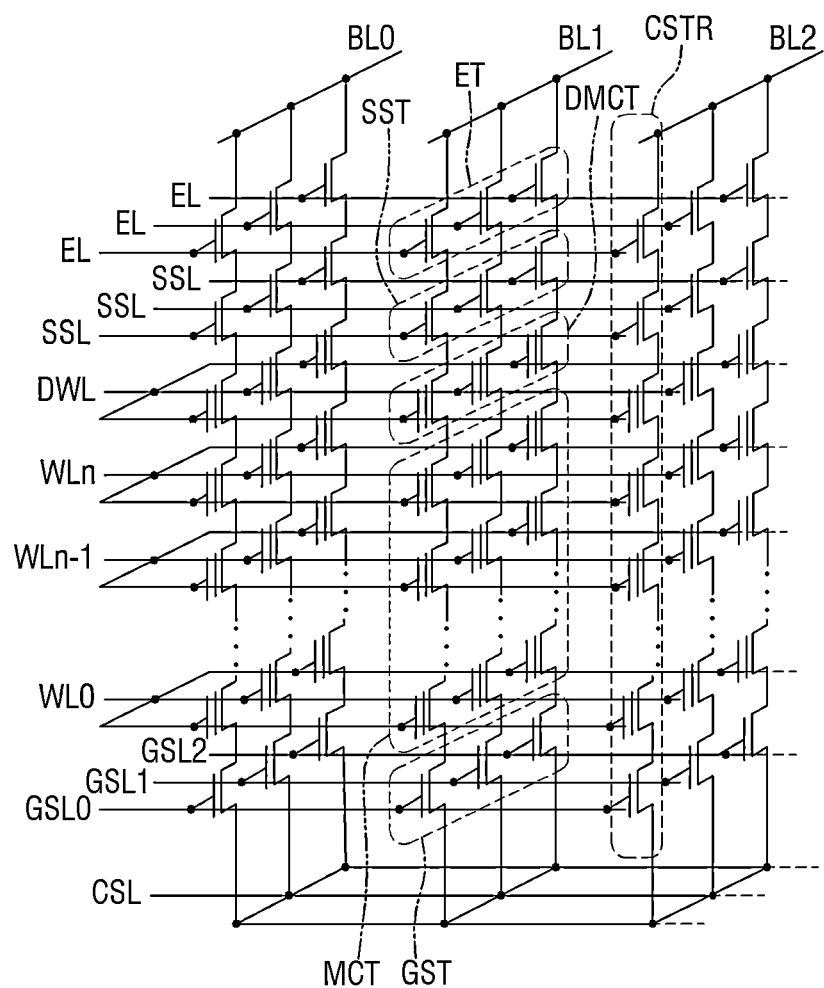
FIG. 2 is an example circuit diagram of a semiconductor memory device according to some embodiments.

FIG. 2 is an example circuit diagram of a semiconductor memory device according to some embodiments.

Referring to FIG. 2, a memory cell array of the semiconductor device according to some embodiments may include a common source line CSL, a plurality of bit lines BL0, BL1 and BL2, and a plurality of cell strings CSTR placed between the common source line CSL and the bit lines BL0, BL1 and BL2.

A plurality of cell strings CSTR may be connected in parallel to each of the bit lines BL0, BL1 and BL2. The plurality of cell strings CSTR may be commonly connected to the common source line CSL. That is, the plurality of cell strings CSTR may be placed between the plurality of bit lines BL0, BL1 and BL2 and one common source line CSL. The plurality of common source lines CSL may be arranged two-dimensionally. Here, the same voltage may be electrically applied to the common source lines CSL, or each of the common source lines CSL may be electrically controlled.

For example, each cell string CSTR may include an erase control transistor ET, a string selection transistor SST, memory cells MCT connected in series, and a ground selection transistor GST. Further, each of the memory cells MCT includes a data storage element.

As an example, each cell string CSTR may include an erase control transistor ET and a string selection transistor SST that are connected in series. The erase control transistor ET may be connected to the bit lines BL0, BL1 and BL2. The ground selection transistor GST may be connected to the common source line CSL. The memory cells MCT may be connected in series between the string selection transistor SST and the ground selection transistor GST.

Furthermore, each cell string CSTR may further include a dummy cell DMCT connected between the string selection transistor SST and the memory cell MCT. Although not shown in the drawing, the dummy cell DMCT may also be connected between the ground selection transistor GST and the memory cell MCT. As another example, the ground selection transistor GST in each cell string CSTR may include a plurality of MOS transistors connected in series. As another example, each cell string CSTR may include a plurality of string selection transistors connected in series.

According to some embodiments, the erase control transistor ET may be controlled by the erase control line EL, and the string selection transistor SST may be controlled by the string selection line SSL. The memory cells MCT may be controlled by a plurality of word lines WL0 to WLn, and the dummy cells DMCT may be controlled by a dummy word line DWL. Further, the ground selection transistor GST may be controlled by ground selection lines GSL0, GSL1 and GSL2. The common source line CSL may be commonly connected to sources of the ground selection transistors GST.

One cell string CSTR may be made up of a plurality of memory cells MCT having different distances from the common source lines CSL. Further, a plurality of word lines WL0 to WLn and DWL may be placed between the common source lines CSL and the bit lines BL0 to BL2.

The gate electrodes of the memory cells MCT placed at substantially the same distance from the common source line CSL may be commonly connected to one of the word lines WL0 to WLn and DWL and may be in an equipotential status. In contrast, in some embodiments, even if the gate electrodes of the memory cells MCT are located at substantially the same level from the common source lines CSL, the gate electrodes placed in different rows or columns may be controlled independently.

The ground selection lines GSL0, GSL1 and GSL2 and the string selection lines SSL may extend in the same direction as, for example, the word lines WL0 to WLn, DWL. The ground selection lines GSL0, GSL1 and GSL2 and the string selection lines SSL located at substantially the same level from the common source lines SSL may be electrically separated from each other.

Further, the erase control lines EL placed at substantially the same level from the common source lines CSL may be electrically separated from each other. Unlike this, although not shown in the drawing, the erase control transistors ET of different cell strings CTSR may be controlled by a common erase control line EL. The erase control transistors ET generate a gate induced drain leak (GIDL) at the time of the erase operation of the memory cell array. That is, the erase control transistors ET may be GIDL transistors.

Figure 3:
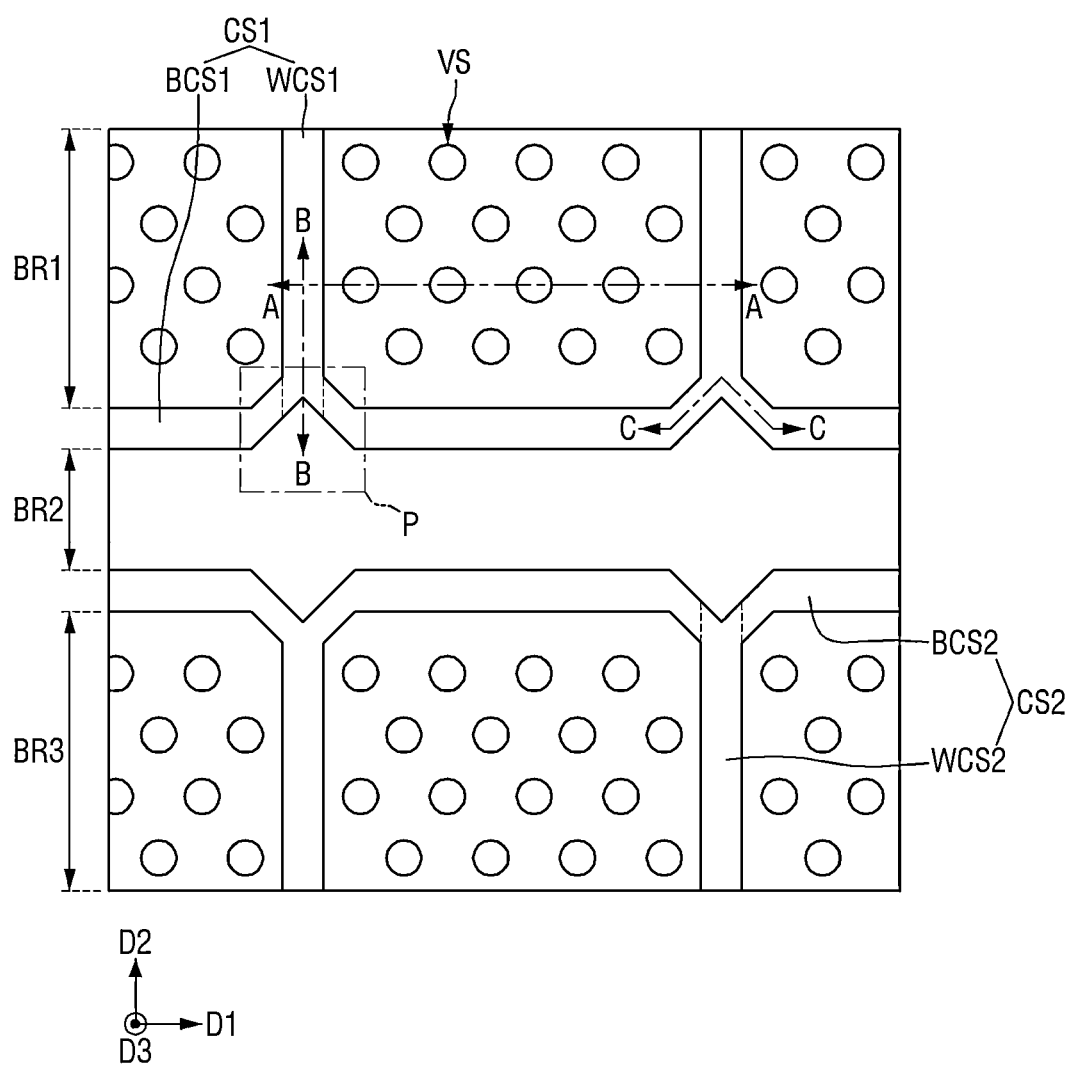
FIG. 3 is an example plan view of a semiconductor memory device according to some embodiments.
Figure 4:
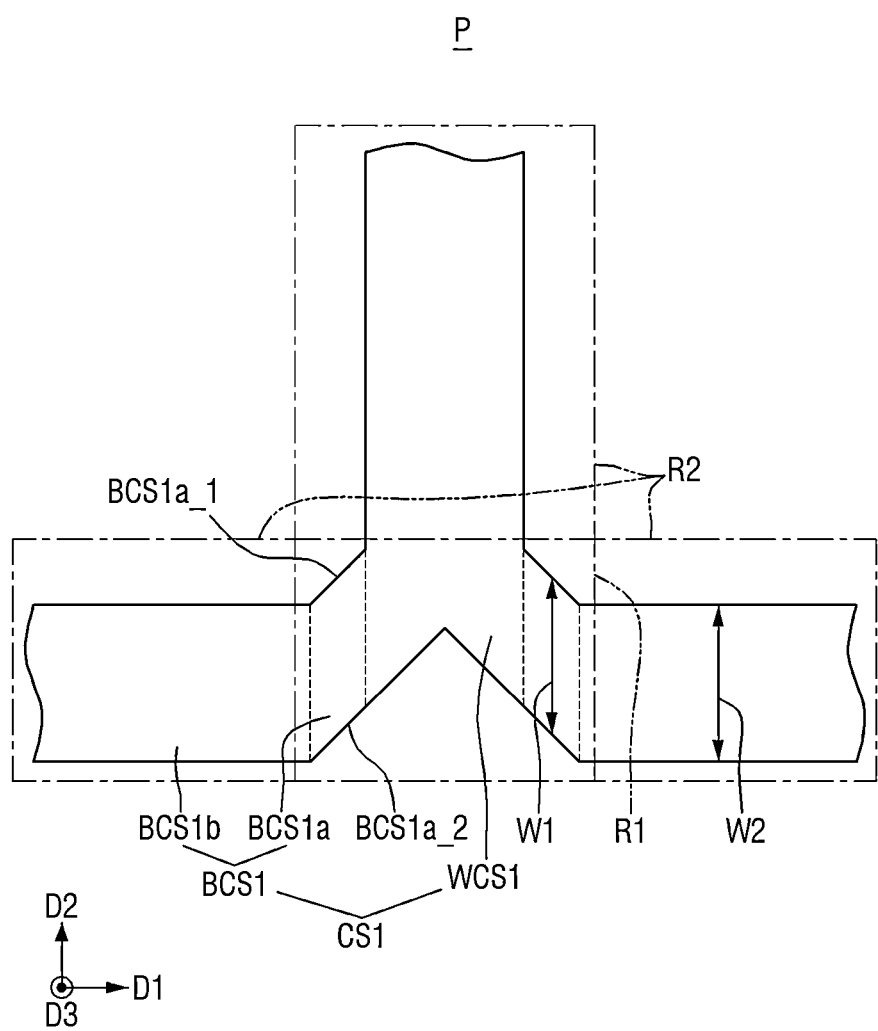
FIG. 4 is an enlarged view of a region P of FIG. 3.
Figure 5:
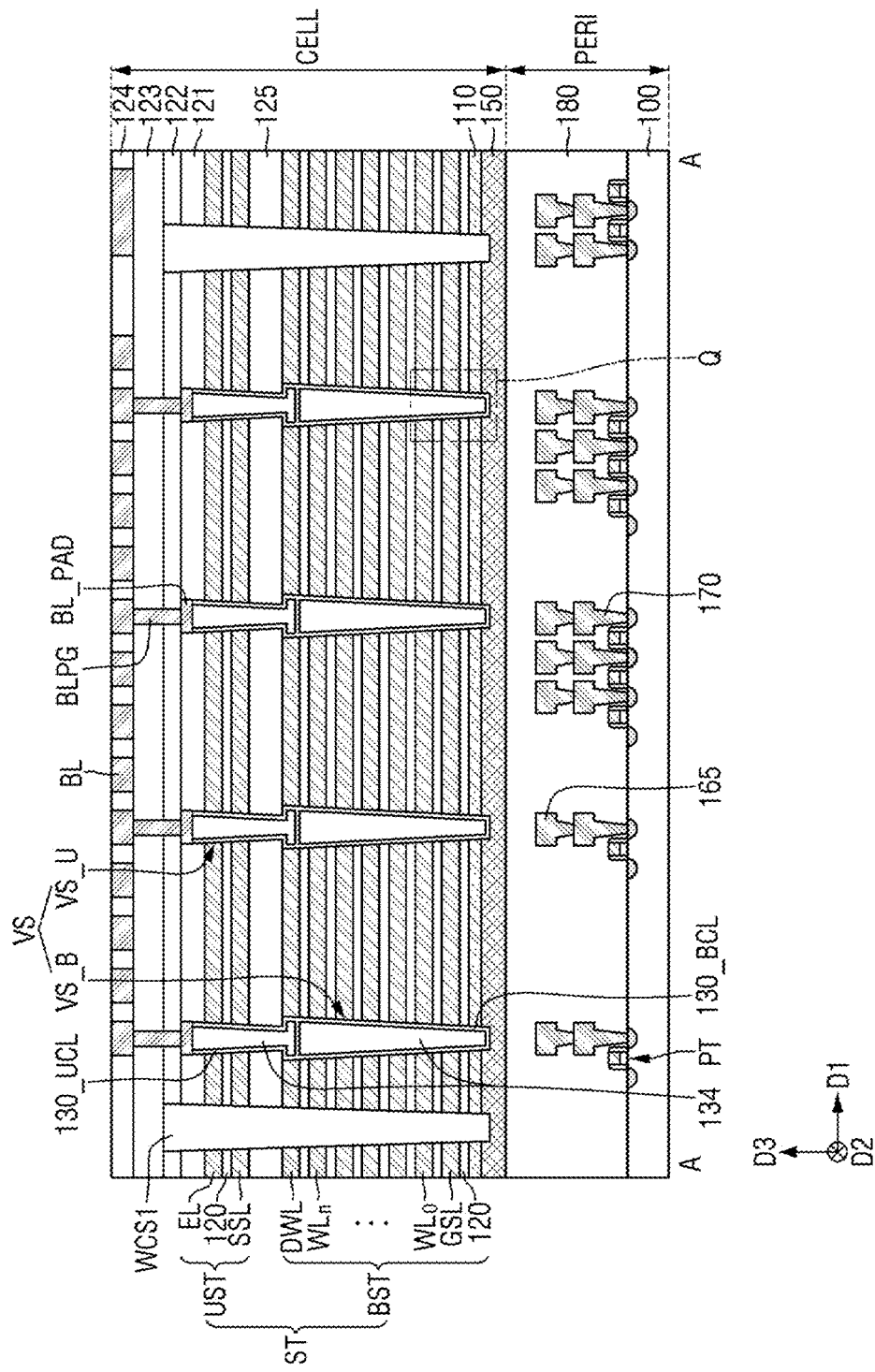
FIG. 5 is an example cross-sectional view taken along line A-A of FIG. 3.
Figure 6:
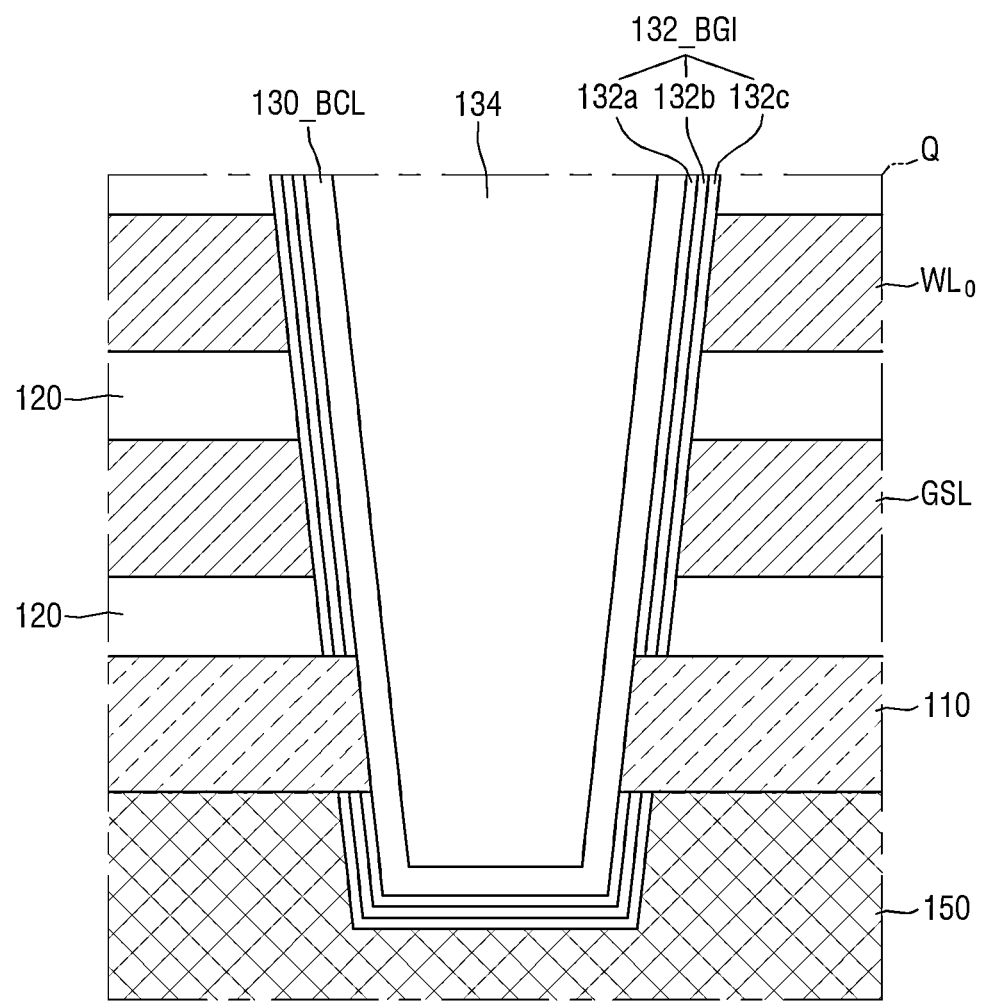
FIG. 6 is an enlarged view of a region Q of FIG. 5.
Figure 7:
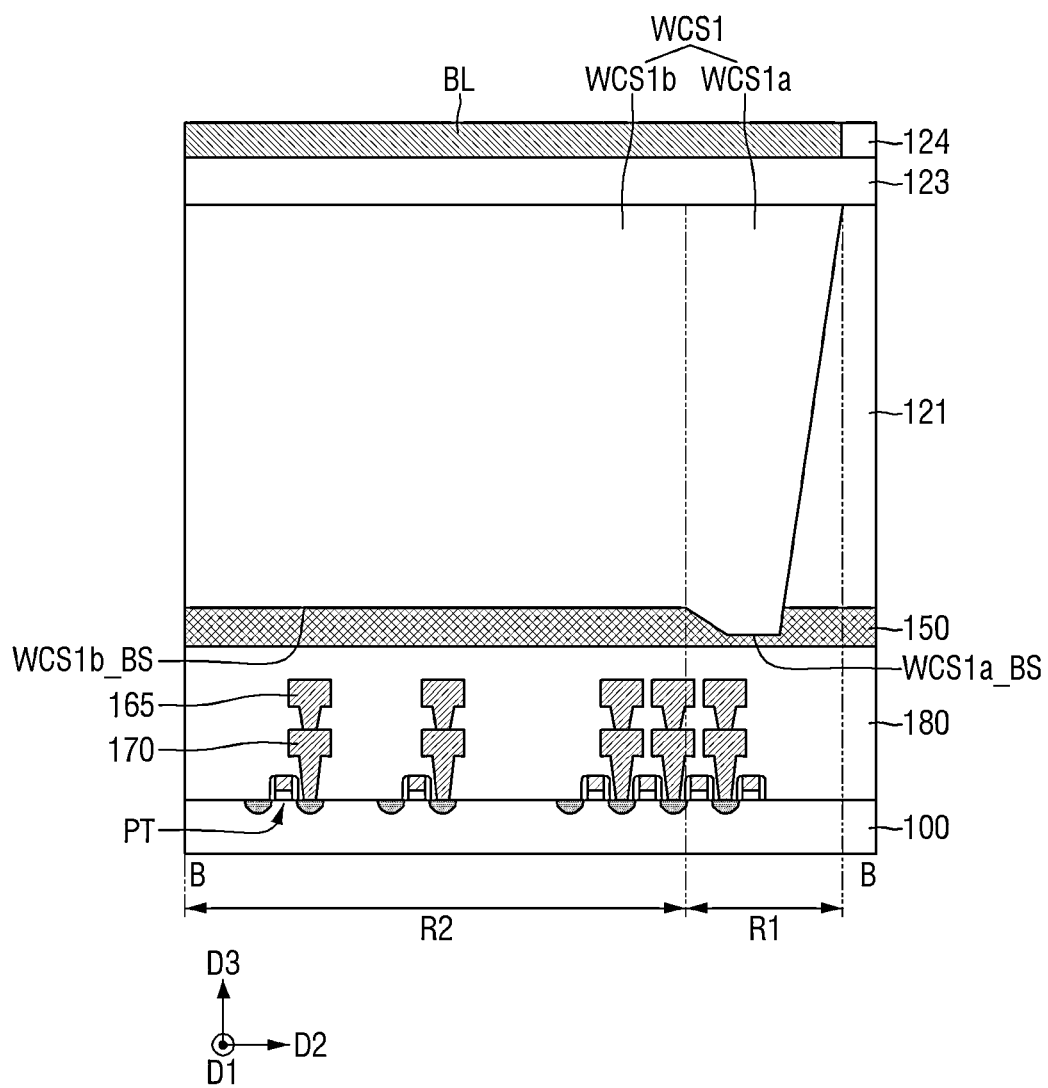
FIG. 7 is an example cross-sectional view taken along a line B-B of FIG. 3.
Figure 8:
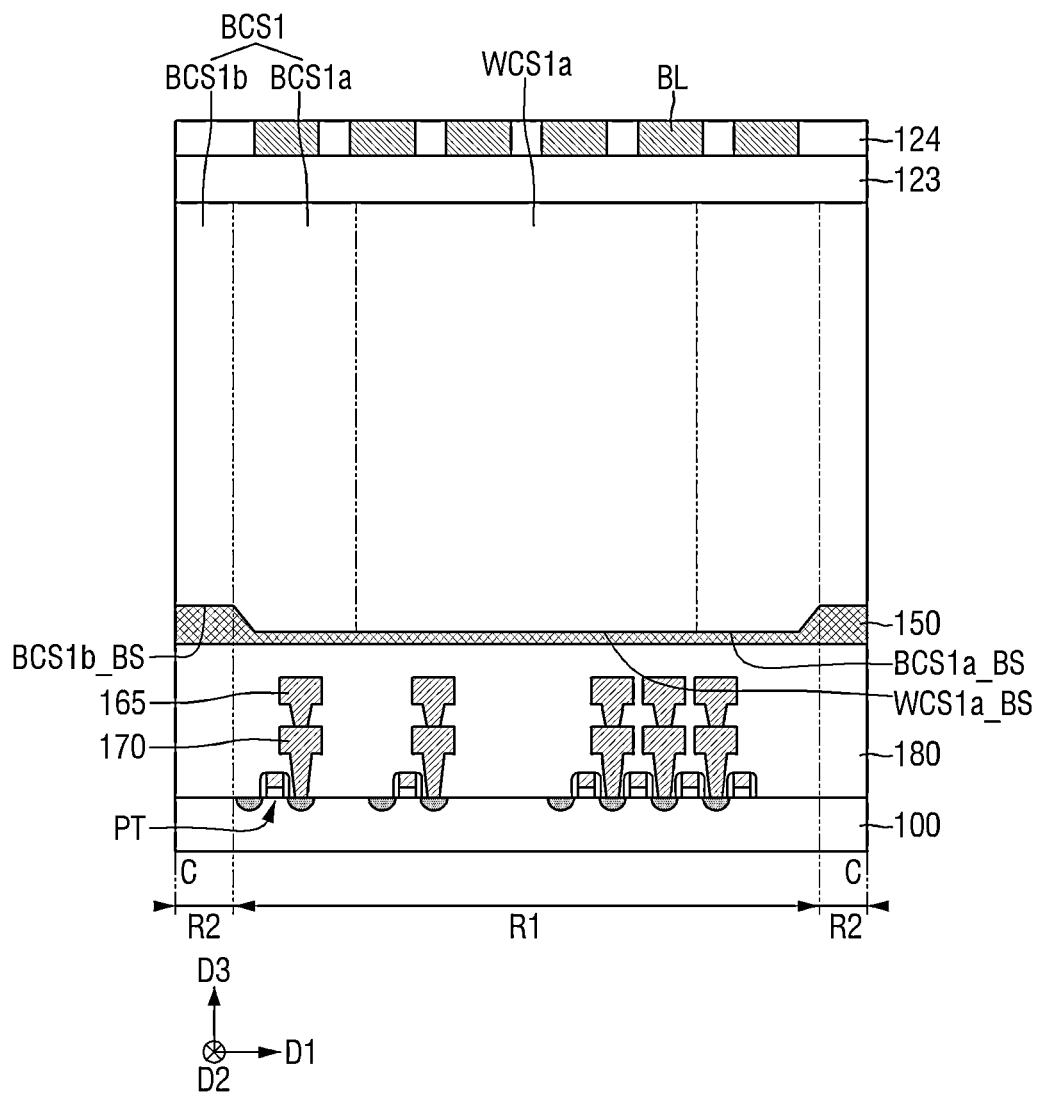
FIG. 8 is an example cross-sectional view taken along a line C-C of FIG. 3.

FIG. 3 is an example plan view of a semiconductor memory device according to some embodiments. FIG. 4 is an enlarged view of a region P of FIG. 3. FIG. 5 is an example cross-sectional view taken along line A-A of FIG. 3. FIG. 6 is an enlarged view of a region Q of FIG. 5. FIG. 7 is an example cross-sectional view taken along a line B-B of FIG. 3. FIG. 8 is an example cross-sectional view taken along a line C-C of FIG. 3.

First, referring to FIGS. 3 and 5, the semiconductor memory device according to some embodiments may include a first substrate 100, a horizontal conductive substrate 150, a plurality of vertical channel structures VS, a first cut structure CS1, and a second cut structure CS2.

The first substrate 100 may include a first block region BR1, a second block region BR2, and a third block region BR3. The first block region BR1 and the second block region BR2 may be defined by a first block cut structure BCS1. The second block region BR2 and the third block region BR3 may be defined by a second block cut structure BCS2. In some embodiments, although the second block region BR2 may be a dummy region in which the vertical channel structure VS is not formed, inventive concepts of the present disclosure are not limited thereto.

The first substrate 100 may include, for example, one of a silicon substrate, a silicon germanium substrate, a germanium substrate, an SGOI (silicon germanium on insulator), an SOI (silicon-on-insulator), and a GOI (Germanium-On-Insulator). Alternatively, the first substrate 100 may include, but is not limited to, semiconductor materials such as indium antimonide, lead tellurium compounds, indium arsenic, indium phosphide, gallium arsenide or gallium antimonide.

The horizontal conductive substrate 150 and the stacked structure ST may be sequentially provided on the first substrate 100. The horizontal conductive substrate 150 may be a common source plate. That is, the horizontal conductive substrate 150 may serve as the common source line CSL of FIG. 2.

The horizontal conductive substrate 150 may include at least one of a conductive semiconductor film, a metal silicide film, and a metal film. When the horizontal conductive substrate 150 includes a conductive semiconductor film, the horizontal conductive substrate 150 may be, for example, silicon (Si), germanium (Ge), silicon germanium (SiGe), gallium arsenide (GaAs), indium gallium arsenide (InGaAs), aluminum gallium arsenide (AlGaAs) or a combination thereof. The horizontal conductive substrate 150 may have a crystal structure including at least one selected from single crystal, amorphous, and polycrystal. The horizontal conductive substrate 150 may include at least one of p-type impurities, n-type impurities and carbon included in the semiconductor film.

In some embodiments, the stacked structure ST may include a lower stacked structure BST and an upper stacked structure UST. That is, the semiconductor memory device according to some embodiments may be a double stack memory device.

The upper stacked structure UST may be provided on the lower stacked structure BST. An inter-structure insulating film 125 may be provided between the lower stacked structure BST and the upper stacked structure UST. The inter-structure insulating film 125 may include, for example, but is not limited to, silicon oxide.

The lower stacked structure BST may include a plurality of lower gate electrodes GSL, WL0 to WLn and DWL and a plurality of inter-electrode insulating films 120. The plurality of lower gate electrodes GSL, WL0 to WLn and DWL and the plurality of inter-electrode insulating films 120 may extend in a first direction D1. The plurality of lower gate electrodes GSL, WL0 to WLn and DWL and the plurality of inter-electrode insulating films 120 may be alternately stacked in a third direction D3. The first direction D1 and the third direction D3 may intersect each other. The first direction D1 and the third direction D3 may be substantially perpendicular to each other. A second direction D2 may be substantially perpendicular to the first direction D1 and the third direction D3.

The upper stacked structure UST may include a first upper gate electrode SSL and a second upper gate electrode EL extending in the first direction D1. The first upper gate electrode SSL may be closer to the first substrate 100 than the second upper gate electrode EL. The upper stacked structure UST may include an inter-electrode insulating film 120 provided between the first upper gate electrode SSL and the second upper gate electrode EL.

The first upper gate electrode SSL may serve as the string selection line of FIG. 2, and the second upper gate electrode EL may serve as the erase control line of FIG. 2. The first upper gate electrode SSL may be included in the string selection transistor SST of FIG. 2, and the second upper gate electrode EL may be included in the erase control transistor ET of FIG. 2.

The plurality of gate electrodes GSL, WL0 to WLn, DWL, SSL and EL may include, for example, but are not limited to, a metal such as tungsten (W), cobalt (Co) and nickel (Ni), or a semiconductor material such as silicon. The inter-electrode insulating film 120 may include, for example, but is not limited to, silicon oxide.

The first cut structure CS1 and the second cut structure CS2 may be provided on the first substrate 100. The first cut structure CS1 may include a first word line cut structure WCS1 and a first block cut structure BCS1. The second cut structure CS2 may include a second word line cut structure WCS2 and a second block cut structure BCS2. The first and second cut structures CS1 and CS2 may penetrate the stacked structure ST in the third direction D3.

The first word line cut structure WCS1 may extend in the second direction D2. The first word line cut structure WCS1 may penetrate the stacked structure ST and separate the plurality of gate electrodes GSL, WL0 to WLn, DWL, SSL, and EL. The first block cut structure BCS1 may extend in the first direction D1. The first block cut structure BCS1 may be connected to the first word line cut structure WCS1. The first block cut structure BCS1 may define a first block region BR1 and a second block region BR2.

The second word line cut structure WCS2 may extend in the second direction D2. The second word line cut structure WCS2 may penetrate the stacked structure ST and separate the plurality of gate electrodes GSL, WL0 to WLn, DWL, SSL, and EL. The second block cut structure BCS2 may extend in the first direction D1. The second block cut structure BCS1 may be connected to the second word line cut structure WCS1. The second block cut structure BCS1 may define a second block region BR2 and a third block region BR3.

In some embodiments, the first cut structure CS1 and the second cut structure CS2 may be symmetrical on the basis of each other around the first direction D1. However, inventive concepts of the present disclosure are not limited thereto.

In some embodiments, from a planar viewpoint, the first cut structure CS1 may have a 'Y' shape in a region in which the first word line cut structure WCS1 and the first block cut structure BCS1 intersect. From a planar viewpoint, the second cut structure CS2 may have a 'Y' shape in a region in which the second word line cut structure WCS2 and the second block cut structure BCS2 intersect. This will be described in more detail referring to FIG. 4. The description of the second cut structure CS2 may be substantially the same as the description of the first cut structure CS1 and therefore will not be provided.

Each of the first cut structure CS1 and the second cut structure CS2 may include, for example, but is not limited to, at least one of Fluorinated TetraEthylOrthoSilicate (FTEOS), Hydrogen SilsesQuioxane (HSQ), Bis-benzoCycloButene (BCB), TetraMethylOrthoSilicate (TMOS), OctaMethyleyCloTetraSiloxane (OMCTS), HexaMethylDiSiloxane (HMDS), TriMethylSilyl Borate (TMSB), DiAcetoxyDitertiaryButoSiloxane (DADBS), TriMethylSilil Phosphate (TMSP), PolyTetraFluoroEthylene (PTFE), TOSZ(Tonen SilaZen), FSG (Fluoride Silicate Glass), polyimide nanofoams such as polypropylene oxide, CDO (Carbon Doped silicon Oxide), OSG (Organo Silicate Glass), SiLK, Amorphous Fluorinated Carbon, silica aerogels, silica xerogels, mesoporous silica or combinations thereof.

Unlike those shown, each of the first cut structure CS1 and the second cut structure CS2 may include a plurality of films.

Referring to FIG. 4, the first cut structure CS1 may include a first region R1 and a second region R2.

The first region R1 may be a region in which the first word line cut structure WCS1 and the first block cut structure BCS1 intersect. The second region R2 may be a region in which the first word line cut structure WCS1 and the first block cut structure BCS1 do not intersect.

In the first region R1, the first cut structure CS1 may have a 'Y' shape from a planar viewpoint. In the second region R2, the first cut structure CS1 may extend in the first direction D1 or the second direction D2.

In some embodiments, the first block cut structure BCS1 may include a first portion BCS1a and a second portion BCS1b. The first portion BCS1a may be a portion connected to the first word line cut structure WCS1. The second portion BCS1b may be a portion connected to the first portion BCS1a. The first portion BCS1a of the first block cut structure BCS1 may extend in an arbitrary direction intersecting the first direction D1 and the second direction D2. For example, the arbitrary direction may be, but is not limited to, a direction tilted by 45° on the basis of the first direction D1. The second portion BCS1b of the first block cut structure BCS1 may extend in the first direction D1.

From a planar viewpoint, a part of the first portion BCS1a of the first block cut structure BCS1 may not overlap the second portion BCS1b of the first block cut structure BCS1 in the first direction D1. The second portion BCS1b of the first block cut structure BCS1 extends in the first direction D1, and meanwhile, the first portion BCS1a of the first block cut structure BCS1 extends in an arbitrary direction different from the first direction D1 and the second direction D2. Therefore, a part of the first portion BCS1a of the first block cut structure BCS1 may not overlap the second portion BCS1b of the first block cut structure BCS1 in the first direction D1.

From a planar viewpoint, a part of the first portion BCS1a of the first block cut structure BCS1 may not overlap the first word line cut structure WCS1 in the first direction D1.

In some embodiments, the first portion BCS1a of the first block cut structure BCS1 may include a first surface BCS1a_1 and a second surface BCS1a_2 that are opposite to each other. The first surface BCS1a_1 and the second surface BCS1a_2 may extend in an arbitrary direction intersecting each of the first direction D1 and the second direction D2. For example, the arbitrary direction may be, but is not limited to, a direction tilted by 45° on the basis of the first direction D1.

The first surface BCS1a_1 and the second surface BCS1a_2 may extend parallel to each other. The direction in which the first surface BCS1a_1 extends may be the same as the direction in which the second surface BCS1a_2 extends. A width W1 in the second direction D2 between the first surface BCS1a_1 and the second surface BCS1a_2 may be constant.

The width W1 in the second direction D2 between the first surface BCS1a_1 and the second surface BCS1a_2 may be constant toward the second portion BCS1b of the first block cut structure BCS1 in the first word line cut structure WCS1. The width W1 in the second direction D2 between the first surface BCS1a_1 and the second surface BCS1a_2 may be the same as a width W2 in the second direction D2 of the second portion BCS1b of the first block cut structure BCS1, but is not limited thereto.

Referring to FIG. 5 again, a vertical channel structure VS may include a lower vertical channel structure VS_B and an upper vertical channel structure VS_U. The lower vertical channel structure VS_B may penetrate the lower stacked structure BST. The upper vertical channel structure VS_U may penetrate the upper stacked structure UST.

The lower vertical channel structure VS_B may include a lower vertical channel film 130_BCL and a vertical insulation pattern 134. Although not shown, a lower channel insulating film (e.g., 132BGI of FIG. 6) may be formed between the lower vertical channel film 130_BCL and the lower stacked structure BST. The lower vertical channel film 130_BCL may include, but is not limited to, a polycrystalline silicon film. The vertical insulation pattern 134 may include, for example, but is not limited to, at least one of silicon oxide, silicon oxynitride and the low dielectric constant materials. The upper vertical channel structure VS_U may include an upper vertical channel film 130_UCL and a vertical insulation pattern 134. The upper vertical channel film 130_UCL may include, but is not limited to, a polycrystalline silicon film.

Referring to FIG. 6, the lower vertical channel structure VS_B may include, for example, a lower vertical channel film 130_BCL, a lower vertical channel insulating film 132_BGI, and a vertical insulation pattern 134.

The lower vertical channel insulating film 132_BGI may include, for example, a tunnel insulating film 132a, a charge storage film 132b, and a blocking insulation film 132c sequentially placed on the lower vertical channel film 130_BCL. The tunnel insulating film 132a, the charge storage film 132b, and the blocking insulation film 132c are merely examples, and are not limited thereto.

The tunnel insulating film 132a may include, for example, a silicon oxide or a high dielectric constant material (e.g., aluminum oxide ($Al_2O_3$), and hafnium oxide ($HfO_2$)) The charge storage film 132b may include, for example, silicon nitride. The blocking insulation film 132c may include, for example, silicon oxide or a high dielectric constant material (e.g., aluminum oxide ($Al_2O_3$), and hafnium oxide ($HfO_2$)). In the semiconductor memory device according to some embodiments, the tunnel insulating film 132a and the blocking insulation film 132c may include silicon oxide.

The tunnel insulating film 132a, the charge storage film 132b and the blocking insulation film 132c may be separated in the lower part of the lower vertical channel film 130_BCL. The separated tunnel insulating film 132a, charge storage film 132b, and blocking insulation film 132c may expose a part of the lower vertical channel film 130_BCL. The vertical structure support film 110 may be placed between the separated tunnel insulating film 132a, the charge storage film 132b, and the blocking insulation film 132c. The vertical structure support film 110 may electrically connect the horizontal conductive substrate 150 and the lower vertical channel film 130_BCL. The vertical structure support film 110 may include a semiconductor material such as, for example, silicon (Si), germanium (Ge) or a mixture thereof.

Referring to FIG. 5 again, a first interlayer insulating film 121, a second interlayer insulating film 122, a third interlayer insulating film 123, and a fourth interlayer insulating film 124 may be provided on the upper stacked structure UST.

The first to fourth interlayer insulating films 121, 122, 123 and 124 may be sequentially stacked in the third direction D3. The first to fourth interlayer insulating films 121, 122, 123 and 124 may include, for example, but are not limited to, silicon oxide.

A bit line pad BL_PAD may be provided in the first interlayer insulating film 121. A bit line plug BLPG may be provided on the bit line pad BL_PAD. The bit line pad BL_PAD may come into contact with the upper vertical channel film 130_UCL. The bit line plug BLPG may penetrate the second interlayer insulating film 122 and the third interlayer insulating film 123. The bit line plug BLPG and the bit line pad BL_PAD may be connected to each other. The bit line plug BLPG and the bit line pad BL_PAD may be aligned in the third direction D3. The bit line pad BL_PAD may be connected to the bit line BL through the bit line plug BLPG.

The bit line BL may be provided inside the fourth interlayer insulating film 124. The bit line BL may extend in the second direction D2. The bit line BL may be connected to the bit line plug BLPG.

The bit line pad BL_PAD, the bit line plug BLPG, and the bit line BL may each include a conductive material.

The semiconductor memory device according to some embodiments may include a cell structure CELL and a peri structure PERI. The peri structure PER may include a peripheral circuit PT, a first metal layer 170, a second metal layer 165, and a peri insulating film 180.

The peri insulating film 180 may be formed on the first substrate 100. The peri insulating film 180 may be interposed between the horizontal conductive substrate 150 and the first substrate 100. The peri insulating film 180 may include, for example, at least one of silicon oxide, silicon nitride, silicon oxynitride, and a low dielectric constant material.

The peripheral circuit PT may be formed on the first substrate 100. The peripheral circuit PT may be formed inside the peri insulating film 180. The peripheral circuit PT may be a circuit that operates the cell structure CELL.

The first metal layer 170 may be connected to the peripheral circuit PT. The first metal layer 170 may be formed of tungsten (W) having a relatively high resistance. The second metal layer 165 may be connected to the first metal layer 170. The second metal layer 165 may be formed of copper (Cu) having a relatively low resistance.

The cell structure CELL may be placed on the peri structure PER. The cell structure CELL may include a lower stacked structure BST, an upper stacked structure UST, a plurality of vertical channel structures VS, and a plurality of bit lines BL.

Referring to FIG. 7, a first word line separation structure WCS1 according to some embodiments may include a first portion WCS1a and a second portion WCS1b. The first portion WC1a of the first word line separation structure WCS1 may be the first word line separation structure WCS1 of the first region RE The second portion WCS1b of the first word line separation structure WCS1 may be the first word line separation structure WCS1 of the second region R2.

In some embodiments, on the basis of the upper side of the first substrate 100, a bottom surface WCS1a_BS of the first portion WCS1a of the first word line separation structure WCS1 may be lower than a bottom surface WCS1b_BS of the second portion WCS1b of the first word line separation structure WCS1.

When forming the first cut structure CS1, more etchants may permeate the first region R1 in which the first word line separation structure WCS1 and the first block separation structure BCS1 intersect. Therefore, the first region R1 may be recessed to be deeper than the second region R2 in which the first word line separation structure WCS1 and the first block separation structure BCS1 do not intersect. Therefore, the bottom surface WCS1a_BS of the first portion WCS1a of the first word line separation structure WCS1 may be lower than the bottom surface WCS1b_BS of the second portion WCS1b of the first word line separation structure WCS1 on the basis of the upper side of the first substrate 100.

Referring to FIG. 8, in the semiconductor memory device according to some embodiments, the bottom surface of the first cut structure CS1 in the first region R1 may be lower than the bottom surface of the first cut structure CS1 in the second region R2 on the basis of the upper side of the first substrate 100.

For example, on the basis of the upper side of the first substrate 100, the bottom surface BCS1a_BS of the first portion BCS1a of the first block cut structure BCS1 in the first region R1 is lower than the bottom surface BCS1b_BS of the second portion BCS1b of the first block cut structure BCS1 in the second region R2. Further, on the basis of the upper side of the first substrate 100, the bottom surface WCS1a_BS of the first portion WCS1a of the first word line cut structure WCS1 is lower than the bottom surface BCS1b_BS of the second portion BCS1b of the first block cut structure BCS1 in the second region R2. The first portion WCS1a of the first word line cut structure WCS1 may be the first word line cut structure WCS1 in the first region R1.

In some embodiments, the bottom surface BCS1a_BS of the first portion BCS1a of the first block cut structure BCS1 may be placed on the same plane as the bottom surface WCS1a_BS of the first portion WCS1a of the first word line cut structure WCS1 in the first region R1 on the basis of the upper side of the first substrate 100.

When forming the first cut structure CS1, more etchants may permeate the first region R1 in which the first word line separation structure WCS1 and the first block separation structure BCS1 intersect. Accordingly, the first region R1 may be recessed to be deeper than the second region R2 in which the first word line separation structure WCS1 and the first block separation structure BCS1 do not intersect. Therefore, on the basis of the upper side of the first substrate 100, the bottom surface BCS1a_BS of the first portion BCS1a of the first block cut structure BCS1 in the first region R1 may be lower than the bottom surface BCS1b_BS of the second portion BCS1b of the first block cut structure BCS1 in the second region R2.

Figure 9:
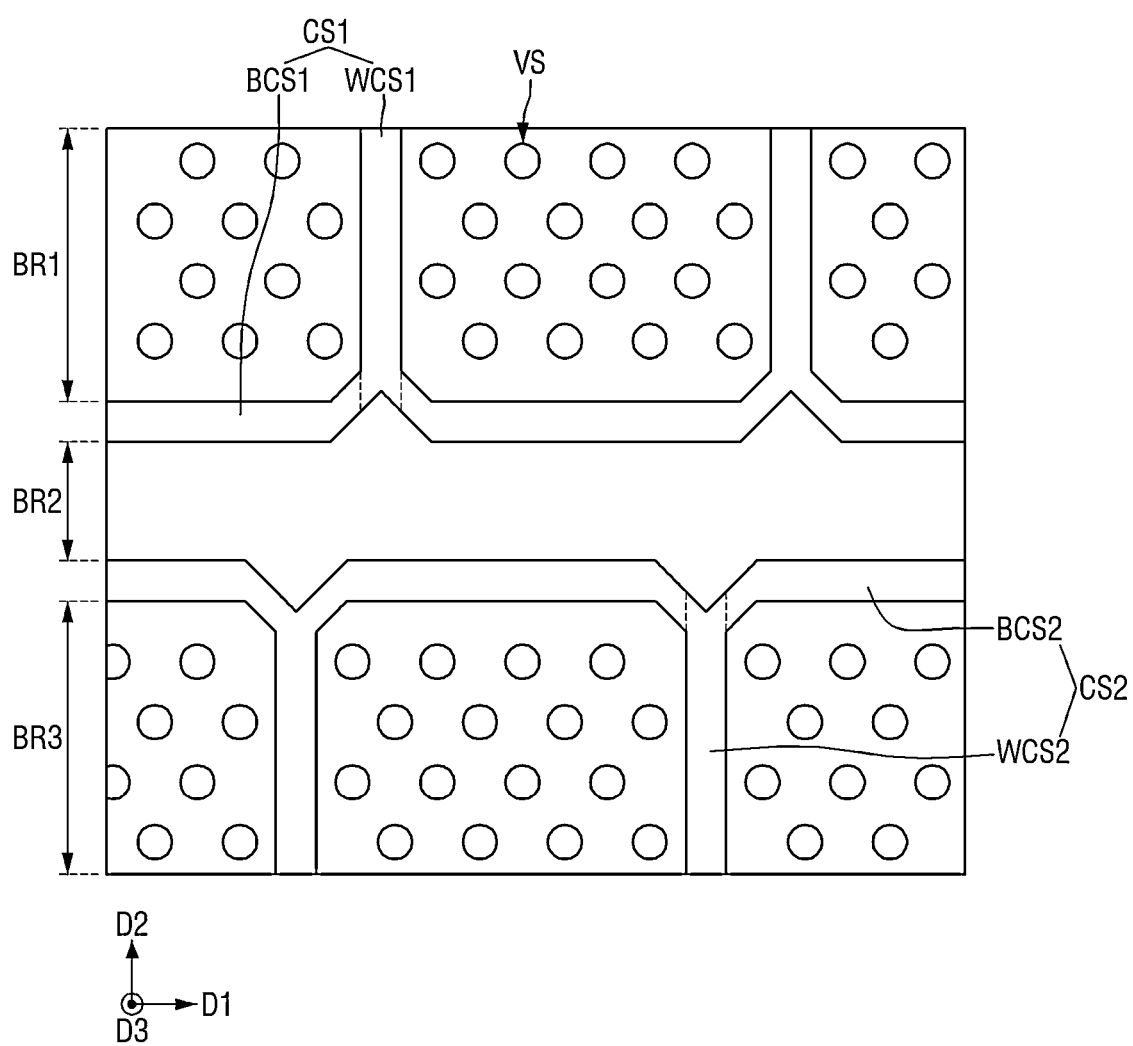
FIGS. 9 and 10 are example plan views for explaining a semiconductor memory device according to some embodiments.
Figure 10:
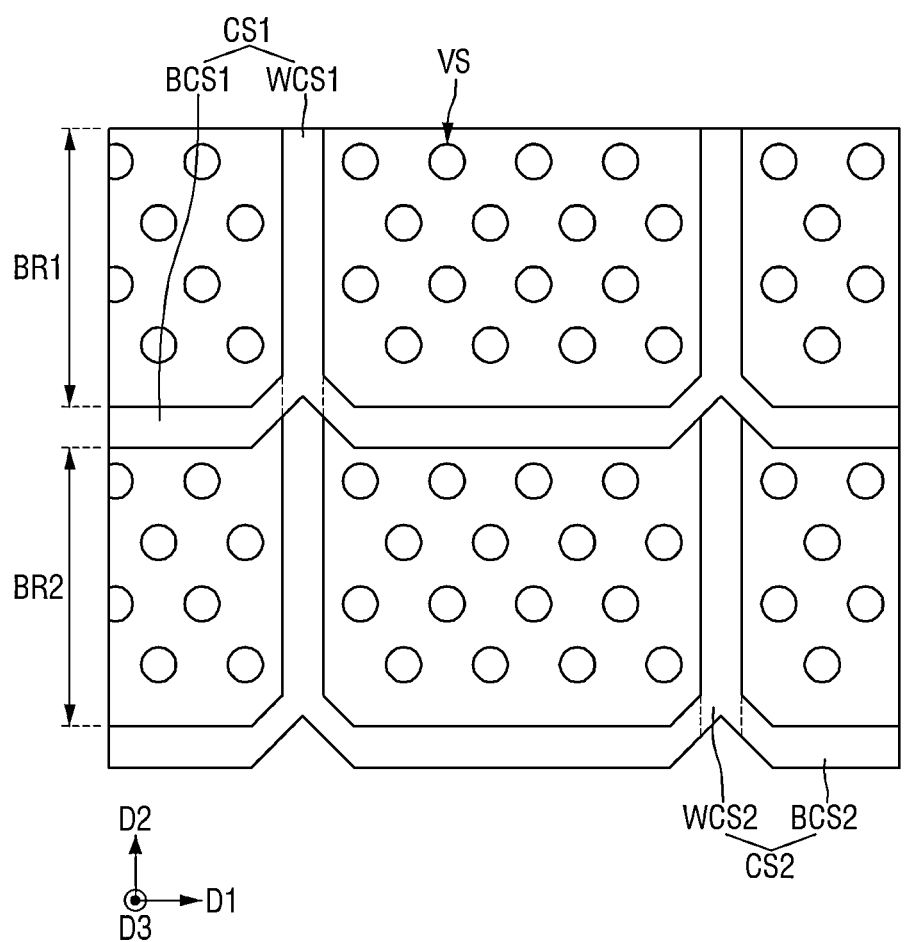

FIGS. 9 and 10 are example plan views for explaining a semiconductor memory device according to some embodiments. For convenience of explanation, the points different from those described using FIGS. 3 to 8 will be mainly described.

Referring to FIG. 9, the first cut structure CS1 and the second cut structure CS2 may not be symmetrical with each other around the first direction D1.

The first word line cut structure WCS1 and the second word line cut structure WCS2 may be offset in the second direction D2. The first word line cut structure WCS1 and the second word line cut structure WCS2 may not overlap each other in the second direction D2.

Even in this case, the second block region BR2 may be a dummy region in which the vertical channel structure VS is not formed.

Referring to FIG. 10, the first cut structure CS1 and the second cut structure CS2 may not be symmetrical to each other around the first direction D1.

For example, the first cut structure CS1 and the second cut structure CS2 may be aligned in the second direction D2. The first word line cut structure WCS1 may overlap the second word line cut structure WCS2 in the second direction D2. The second word line cut structure WCS2 may be connected to the first cut structure CS1.

In this case, the second block region BR2 may not be a dummy region. A vertical channel structure VS may be formed in the second block region BR2.

FIGS. 11 to 16 are example diagrams for explaining the cut structure according to some embodiments. For convenience of explanation, the points different from those described using FIG. 4 will be mainly described.

Figure 11:
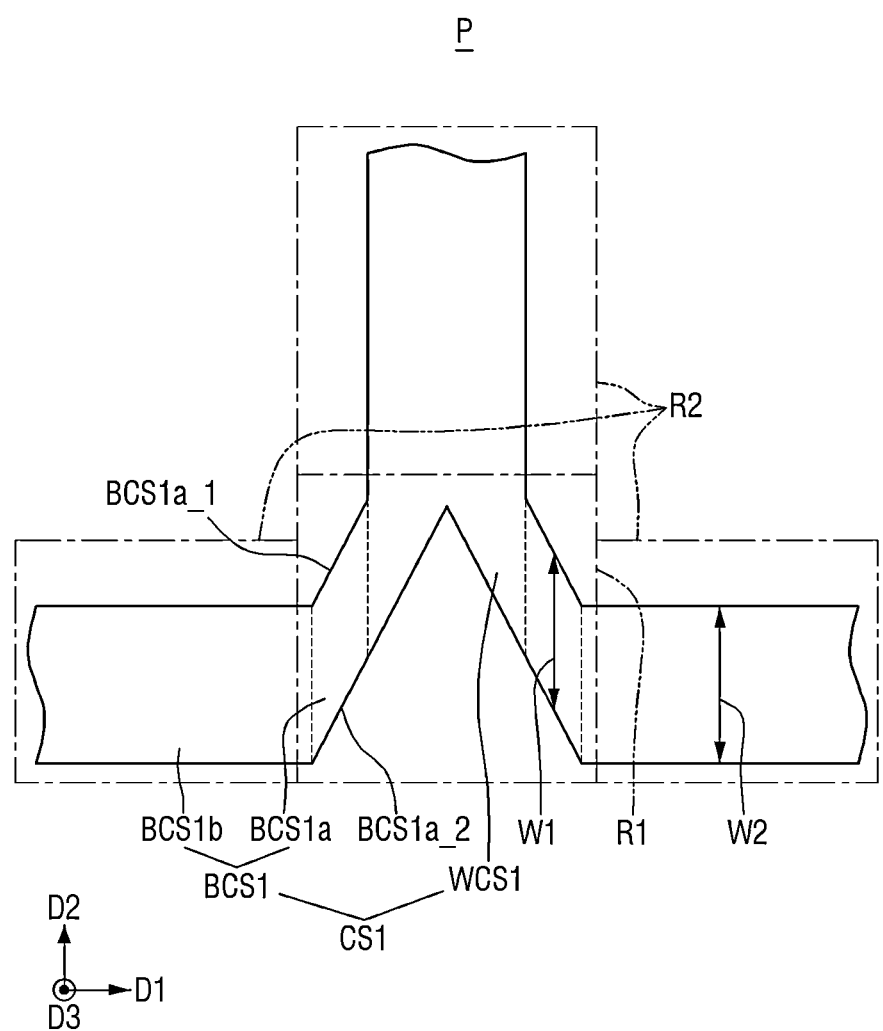
FIGS. 11 to 16 are example diagrams for explaining the cut structure according to some embodiments.

First, referring to FIG. 11, in the semiconductor memory device according to some embodiments, a first portion BCS1a of the first block cut structure BCS1 may extend in an arbitrary different from the first direction D1 and the second direction D2. The arbitrary direction may be a direction tilted by 45° or more and 90° or less on the basis of the first direction D1.

For example, the first surface BCS1a_1 and the second surface BCSa_2 of the first portion BCS1a of the first block cut structure BCS1 may each extend in the arbitrary direction different from the first direction D1 and the second direction D2. The arbitrary direction may be a direction tilted by 45° or more and 90° or less on the basis of the first direction D1. The first surface BCS1a_1 and the second surface BCSa_2 of the first portion BCS1a of the first block cut structure BCS1 may extend in parallel with each other. The direction in which the first surface BCSA1a_1 extends may be the same as the direction in which the second surface BCSa_2 extends.

In this case, the width W1 of the first portion BCS1a of the first block cut structure BCS1 in the second direction D2 may be constant toward the second portion BCS1b of the first block cut structure BCS1 from the first word line cut structure WCS1.

Figure 12:
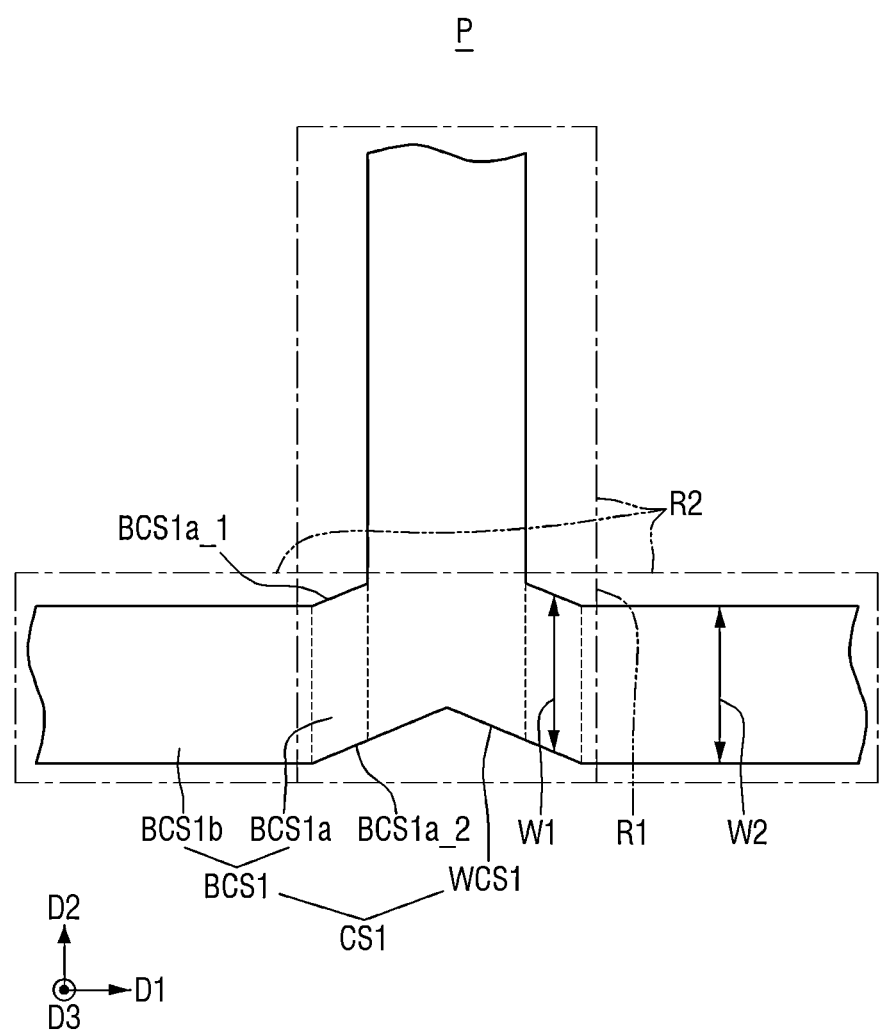

Referring to FIG. 12, in the semiconductor memory device according to some embodiments, the first portion BCS1a of the first block cut structure BCS1 may extend in an arbitrary direction different from the first direction D1 and the second direction D2. The arbitrary direction may be a direction tilted by 0° or more and 45° or less on the basis of the first direction D1.

For example, the first surface BCS1a_1 and the second surface BCSa_2 of the first portion BCS1a of the first block cut structure BCS1 may each extend in an arbitrary direction different from the first direction D1 and the second direction D2. The arbitrary direction may be a direction tilted by 0° or more and 45° or less on the basis of the first direction D1.

In this case, the width W1 of the first portion BCS1a of the first block cut structure BCS1 in the second direction D2 may be constant toward the second portion BCS1b of the first block cut structure BCS1 from the first word line cut structure WCS1.

Figure 13:
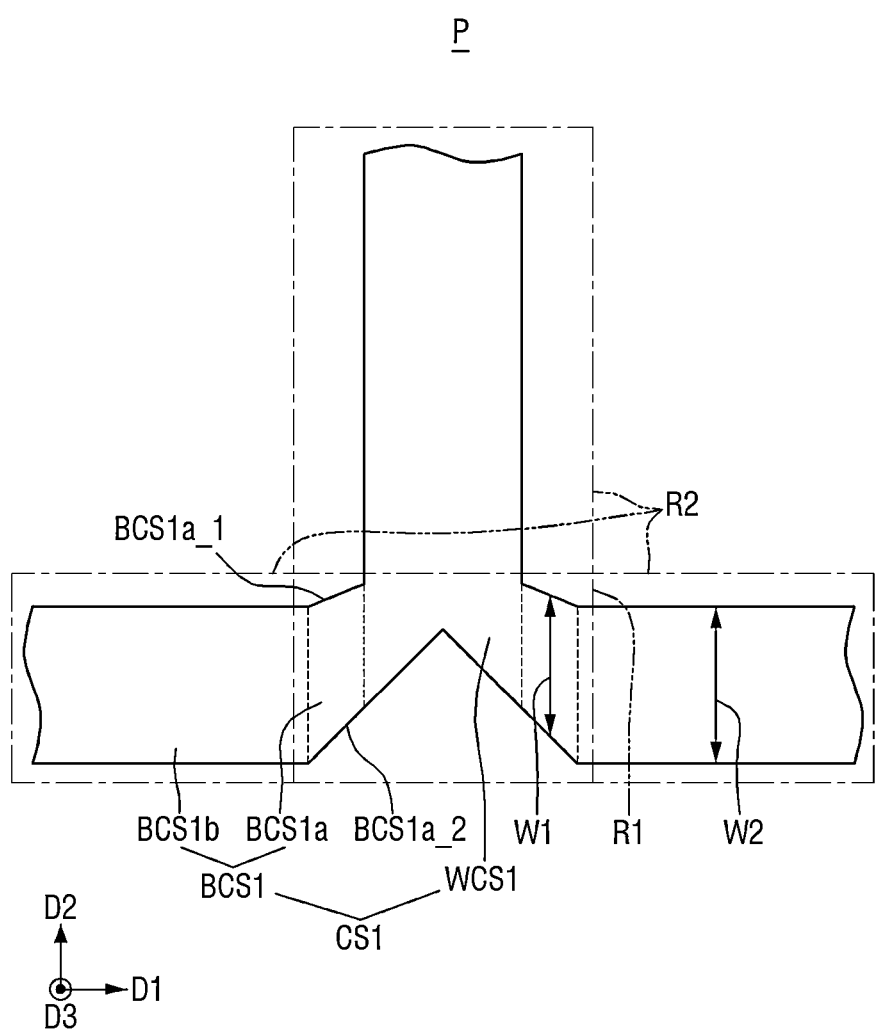

Referring to FIG. 13, in the semiconductor memory device according to some embodiments, the direction in which the first surface BCS1a_1 extends may be different from the direction in which the second surface BCSa_2 extends.

For example, the direction in which the first surface BCS1a_1 extends may be a direction tilted by 0° or more and 45° or less on the basis of the first direction D1. The direction in which the second surface BCS1a_2 extends may be a direction tilted by 45° on the basis of the first direction D1.

In this case, the width W1 of the first portion BCS1a of the first block cut structure BCS1 in the second direction D2 may gradually increase toward the second portion BCS1b of the first block cut structure BCS1 from the first word line cut structure WCS1. At this time, when the width W1 of the first portion BCS1a of the first block cut structure BCS1 in the second direction D2 may be different from the width W2 of the second portion BCS1b of the first block cut structure BCS1 in the second direction D2.

Figure 14:
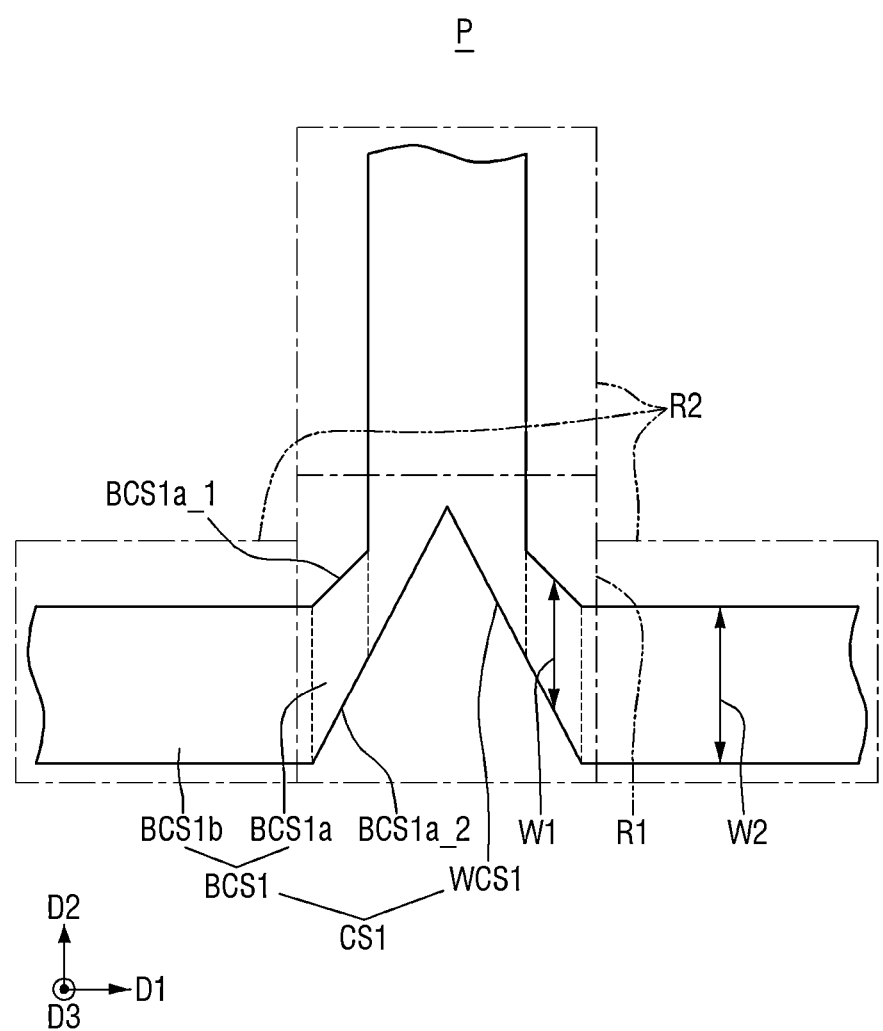

Referring to FIG. 14, in the semiconductor memory device according to some embodiments, the direction in which the first surface BCS1a_1 extends may be different from the direction in which the second surface BCSa_2 extends.

For example, the direction in which the first surface BCS1a_1 extends may be a direction tilted by 45° on the basis of the first direction D1. The direction in which the second surface BCS1a_2 extends may be a direction tilted by 45° or more and 90° or less on the basis of the first direction D1.

In this case, the width W1 of the first portion BCS1a of the first block cut structure BCS1 in the second direction D2 may gradually increase toward the second portion BCS1b of the first block cut structure BCS1 from the first word line cut structure WCS1. At this time, when the width W1 of the first portion BCS1a of the first block cut structure BCS1 in the second direction D2 may be different from the width W2 of the second portion BCS1b of the first block cut structure BCS1 in the second direction D2.

Figure 15:
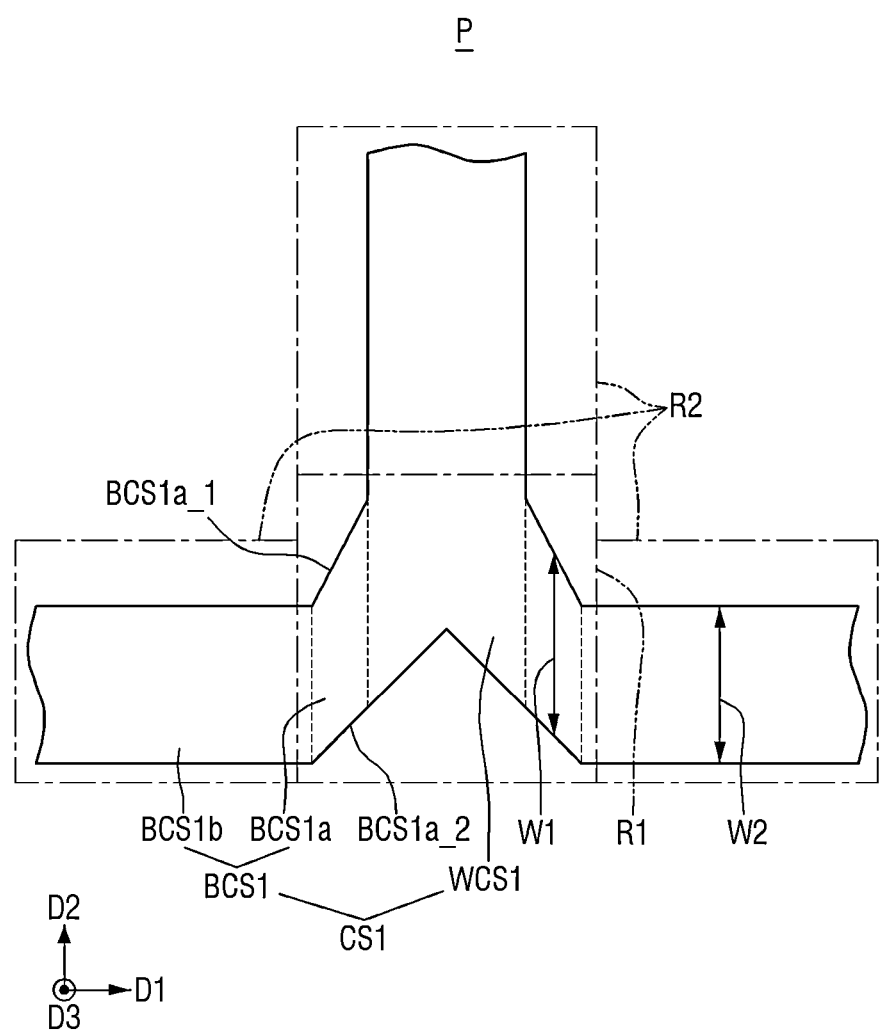

Referring to FIG. 15, in the semiconductor memory device according to some embodiments, the direction in which the first surface BCS1a_1 extends may be different and the direction in which the second surface BCSa_2 extends.

For example, the direction in which the first surface BCS1a_1 extends may be a direction tilted by 45° or more and 90° or less on the basis of the first direction D1. The direction in which the second surface BCS1a_2 extends may be a direction tilted by 45° on the basis of the first direction D1.

In this case, the width W1 of the first portion BCS1a of the first block cut structure BCS1 in the second direction D2 may gradually decrease toward the second portion BCS1b of the first block cut structure BCS1 from the first word line cut structure WCS1. At this time, when the width W1 of the first portion BCS1a of the first block cut structure BCS1 in the second direction D2 may be different from the width W2 of the second portion BCS1b of the first block cut structure BCS1 in the second direction D2.

Figure 16:
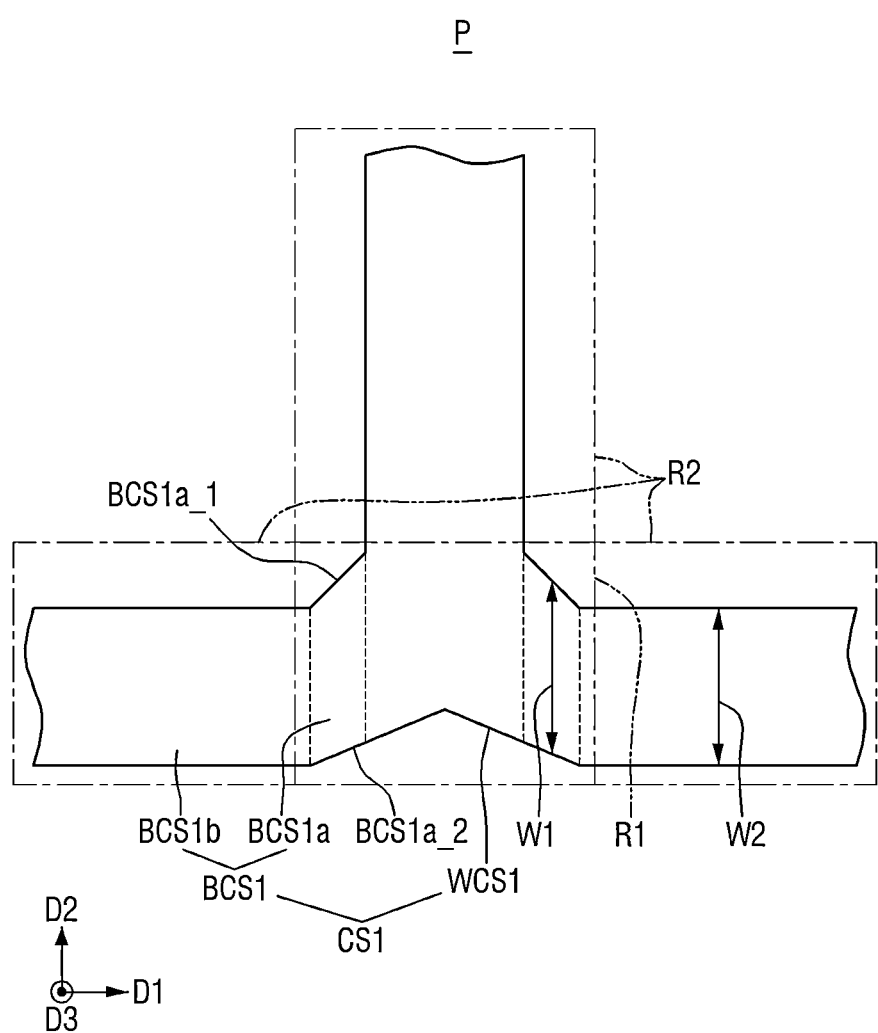

Referring to FIG. 16, in the semiconductor memory device according to some embodiments, the direction in which the first surface BCS1a_1 extends may be different from the direction in which the second surface BCS1a_2 extends.

For example, the direction in which the first surface BCS1a_1 extends may be a direction tilted by 45° on the basis of the first direction D1. The direction in which the second surface BCS1a_2 extends may be a direction tilted by 0° or more and 45° or less on the basis of the first direction D1.

In this case, the width W1 of the first portion BCS1a of the first block cut structure BCS1 in the second direction D2 may gradually decrease toward the second portion BCS1b of the first block cut structure BCS1 from the first word line cut structure WCS1. At this time, when the width W1 of the first portion BCS1a of the first block cut structure BCS1 in the second direction D2 may be different from the width W2 of the second portion BCS1b of the first block cut structure BCS1 in the second direction D2.

Figure 17:
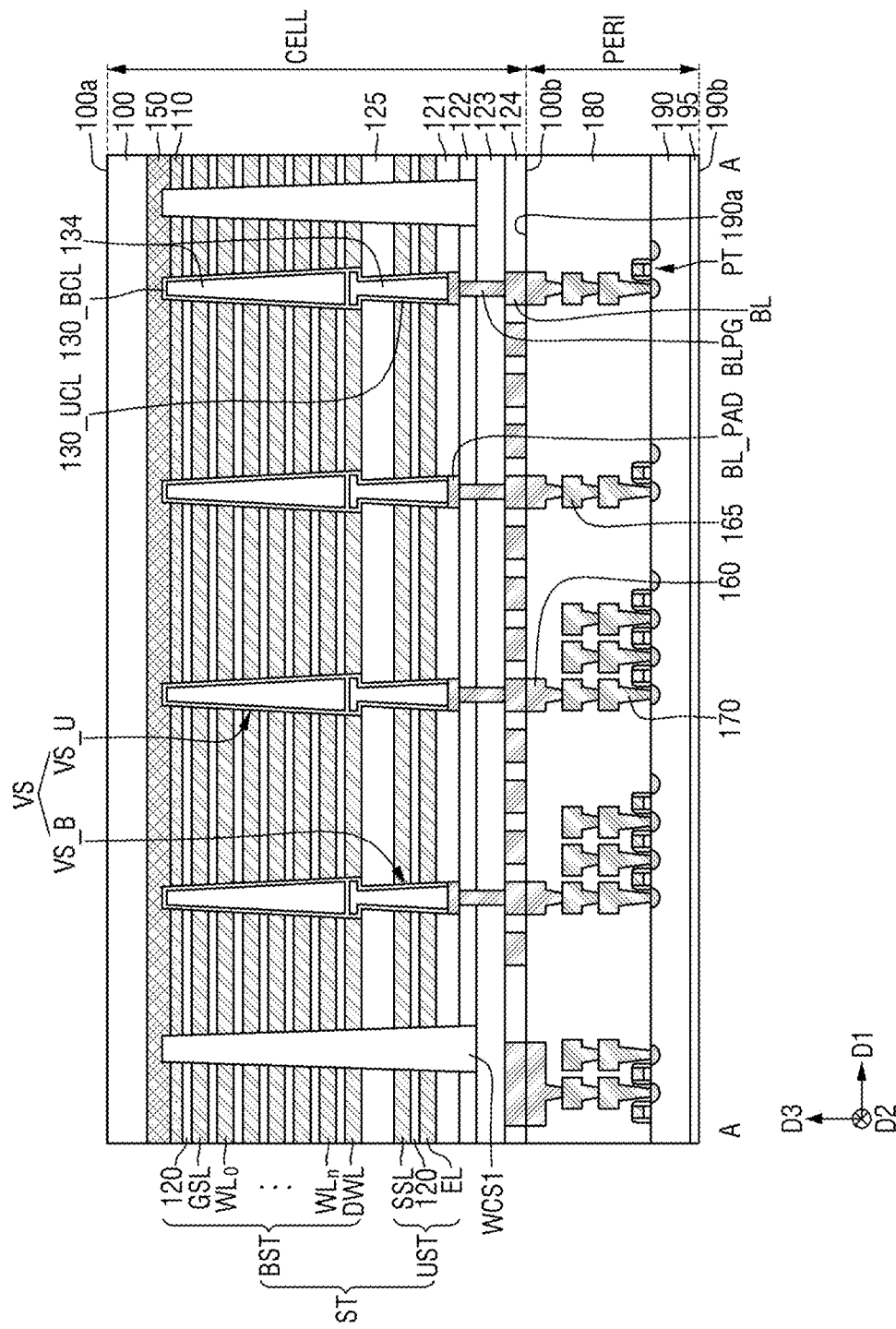
FIGS. 17 and 18 are example cross-sectional views for explaining a semiconductor memory device according to some embodiments.
Figure 18:
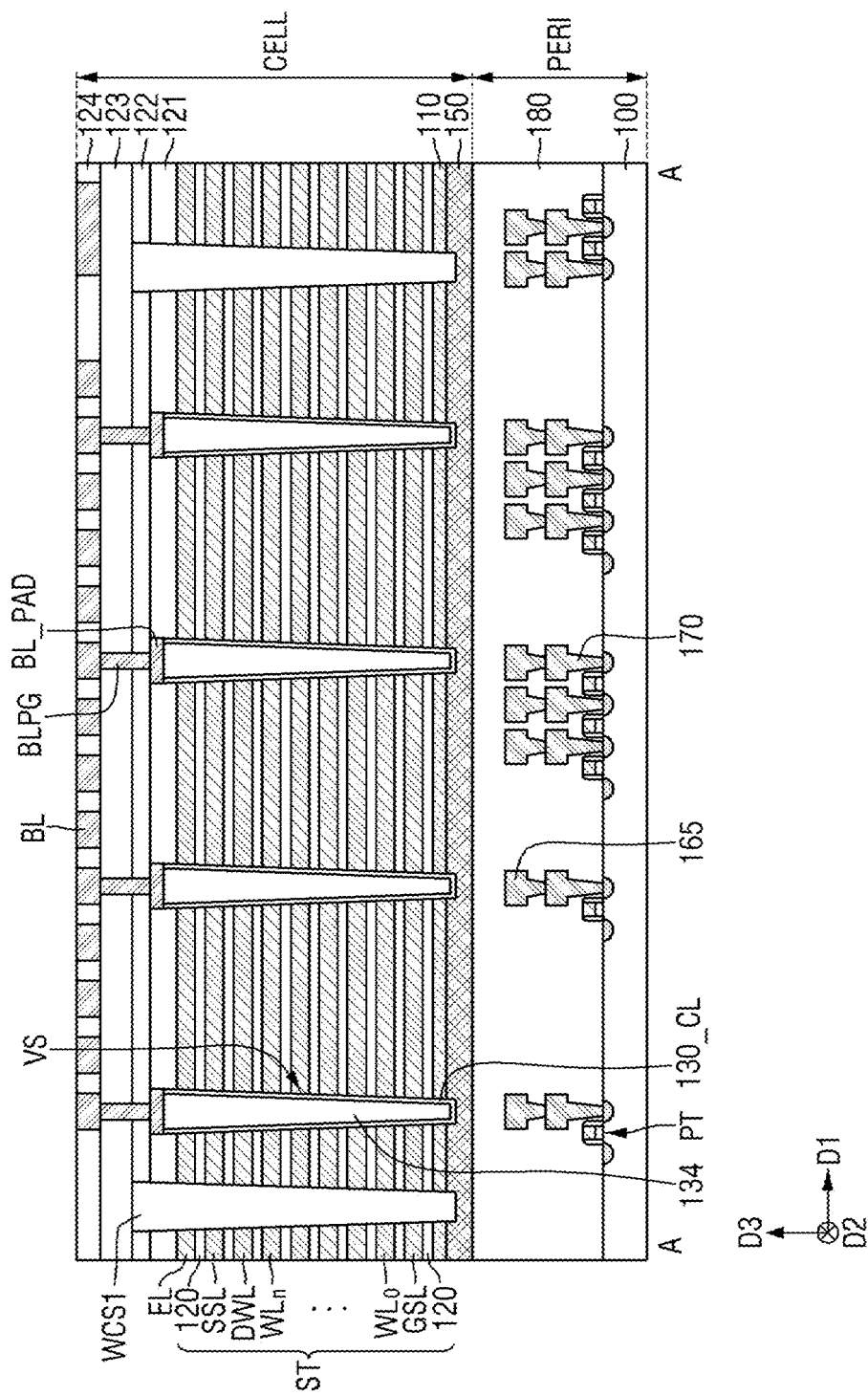

FIGS. 17 and 18 are example cross-sectional views for explaining a semiconductor memory device according to some embodiments. For convenience of explanation, the points different from those described referring to FIG. 5 will be mainly described.

Referring to FIG. 17, the peri structure PERI may be directly bonded to the cell structure CELL.

The cell structure CELL may include a third surface 100a and a fourth surface 100b opposite to the third surface 100a. The third surface 100a of the cell structure CELL may be one surface of the first substrate 100. The fourth surface 100b of the cell structure CELL may be one surface of the fourth interlayer insulating film 124. The fourth surface 100b of the cell structure CELL may expose the bit line BL.

The peri structure PER may include a second substrate 190, a lower insulating film 195, a peri insulating film 180, a peripheral circuit PT, a first metal layer 170, a second metal layer 165, and a third metal layer 160.

The lower insulating film 195 may be placed below the second substrate 190. The peri insulating film 180 may be placed on the second substrate 190. The second substrate 190 may be interposed between the lower insulating film 195 and the peri insulating film 180.

The peripheral circuit PT, the first metal layer 170, the second metal layer 165, and the third metal layer 160 may be placed inside the peri insulating film 180. The third metal layer 160 may be placed on the second metal layer 165. The third metal layer 160 may be bonded to the bit line BL.

The peri structure PER may include a fifth surface 190a and a sixth surface 190b opposite to the fifth surface 190a. The fifth surface 190a of the peri structure PER may be an upper surface of the peri insulating film 180. The sixth surface 190b of the peri structure PER may be a lower surface of the lower insulating film 195. The fifth surface 190a of the peri structure PERI may expose the third metal layer 160.

The fourth surface 100b of the cell structure CELL and the fifth surface 190a of the peri structure PERI may be bonded to each other.

Referring to FIG. 18, the semiconductor memory device according to some embodiments may be a single stack memory device.

For example, the stacked structure ST is not divided into a lower stacked structure and an upper stacked structure. Further, the vertical channel structure VS is not divided into a lower vertical channel structure and an upper vertical channel structure. The vertical channel structure VS may be formed inside a trench penetrating the stacked structure ST. The trench may penetrate the stacked structure ST at one time. In this case, the inter-structure insulating film may not be placed.

Further, a vertical channel film 130_CL may not be divided into a lower vertical channel film and an upper vertical channel film. The vertical channel film 130_CL may include, but is not limited to, a polycrystalline silicon film.

Figure 19:
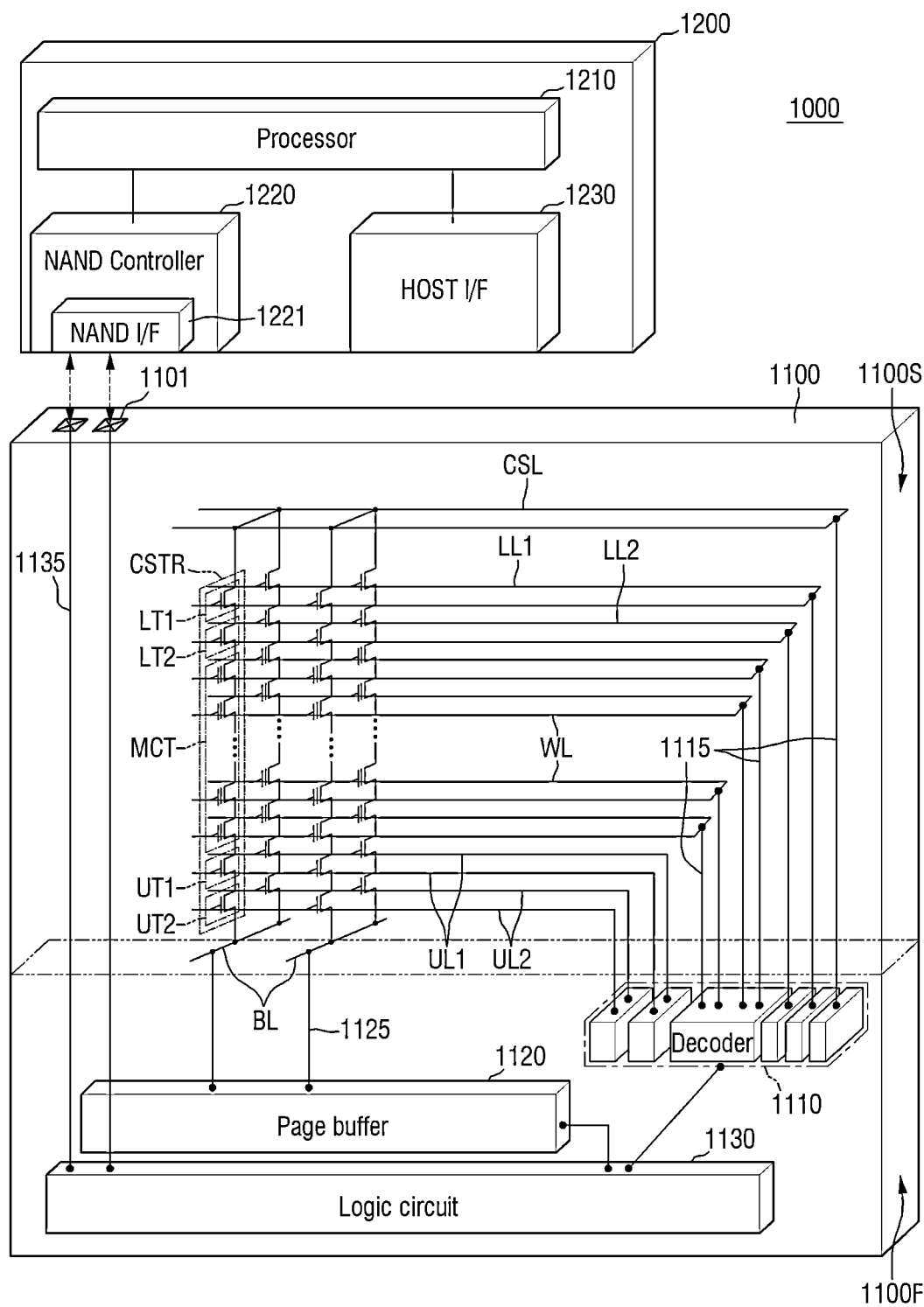
FIG. 19 is a schematic block diagram for explaining an electronic system including the semiconductor memory device according to some embodiments.
Figure 20:
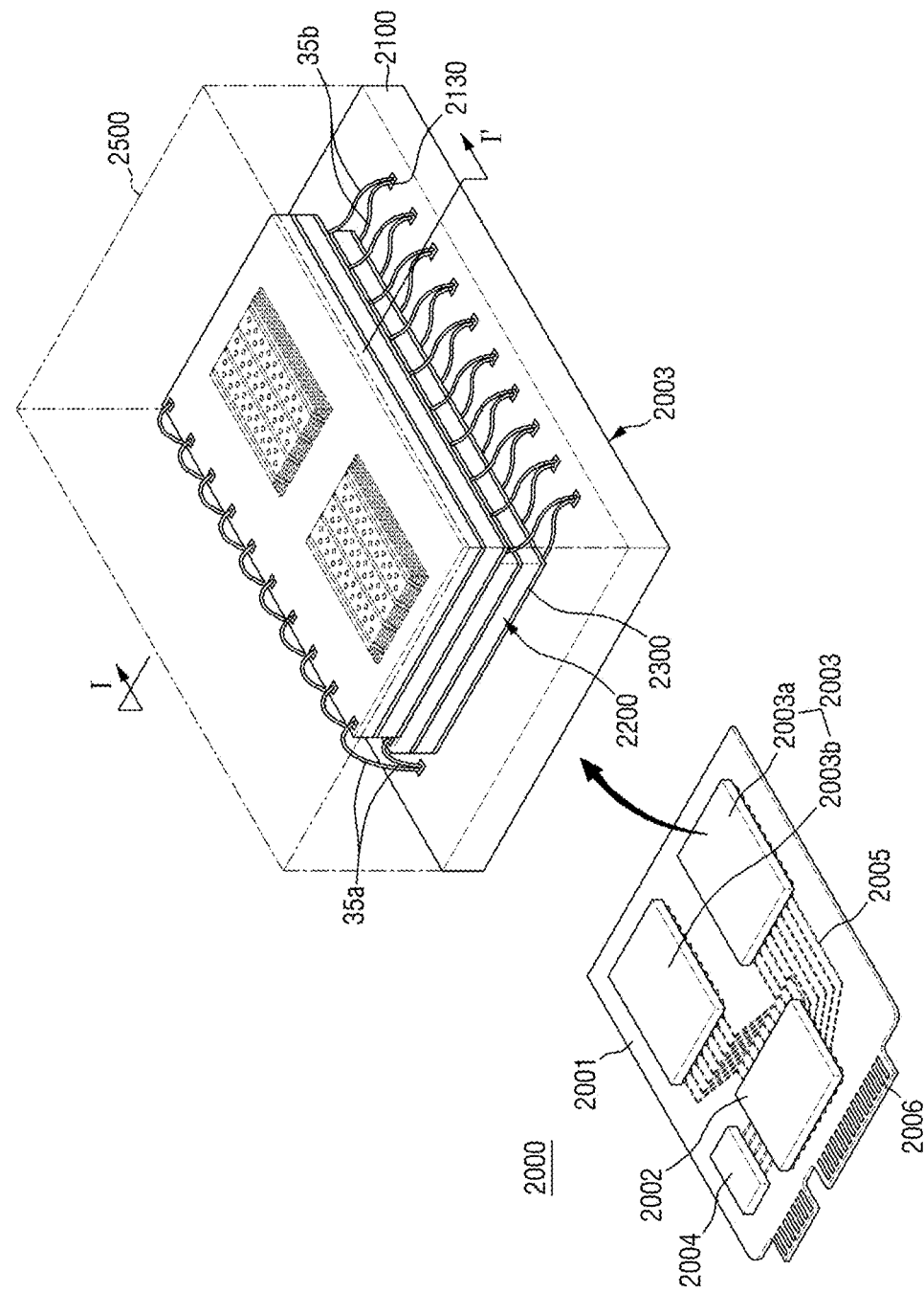
FIG. 20 is a schematic perspective view for explaining the electronic system according to some embodiments.
Figure 21:
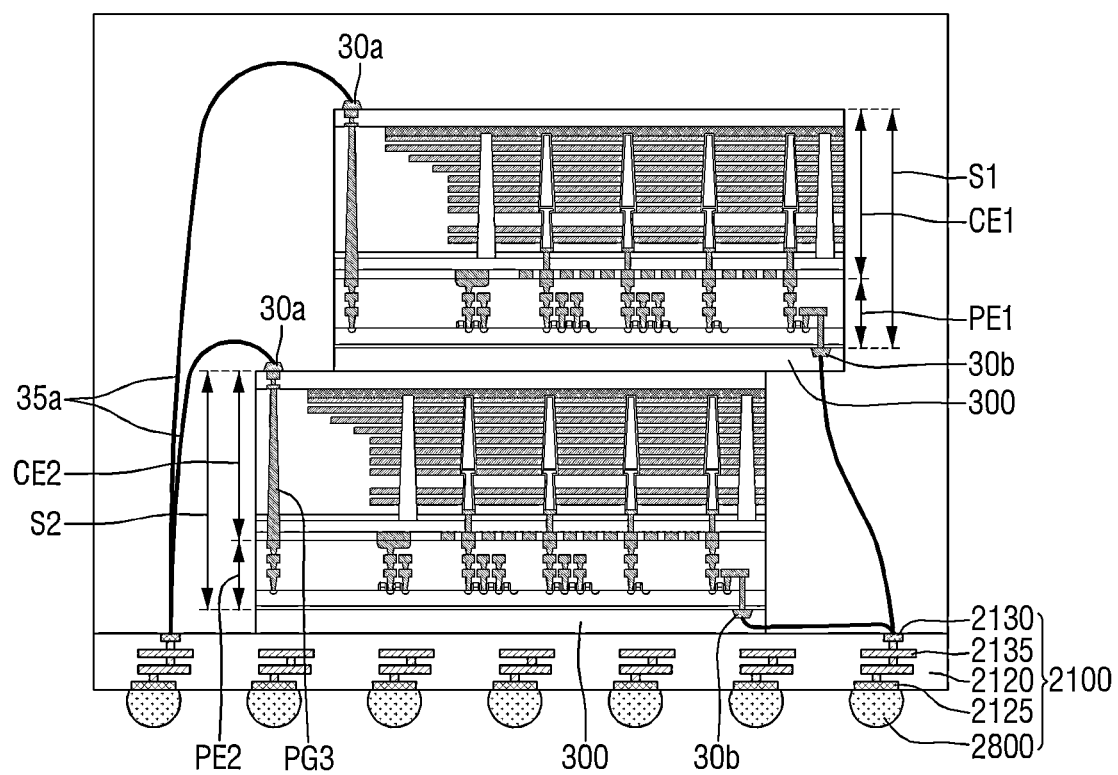
FIGS. 21 to 23 are various schematic cross-sectional views taken along I-I' of FIG. 20.
Figure 22:
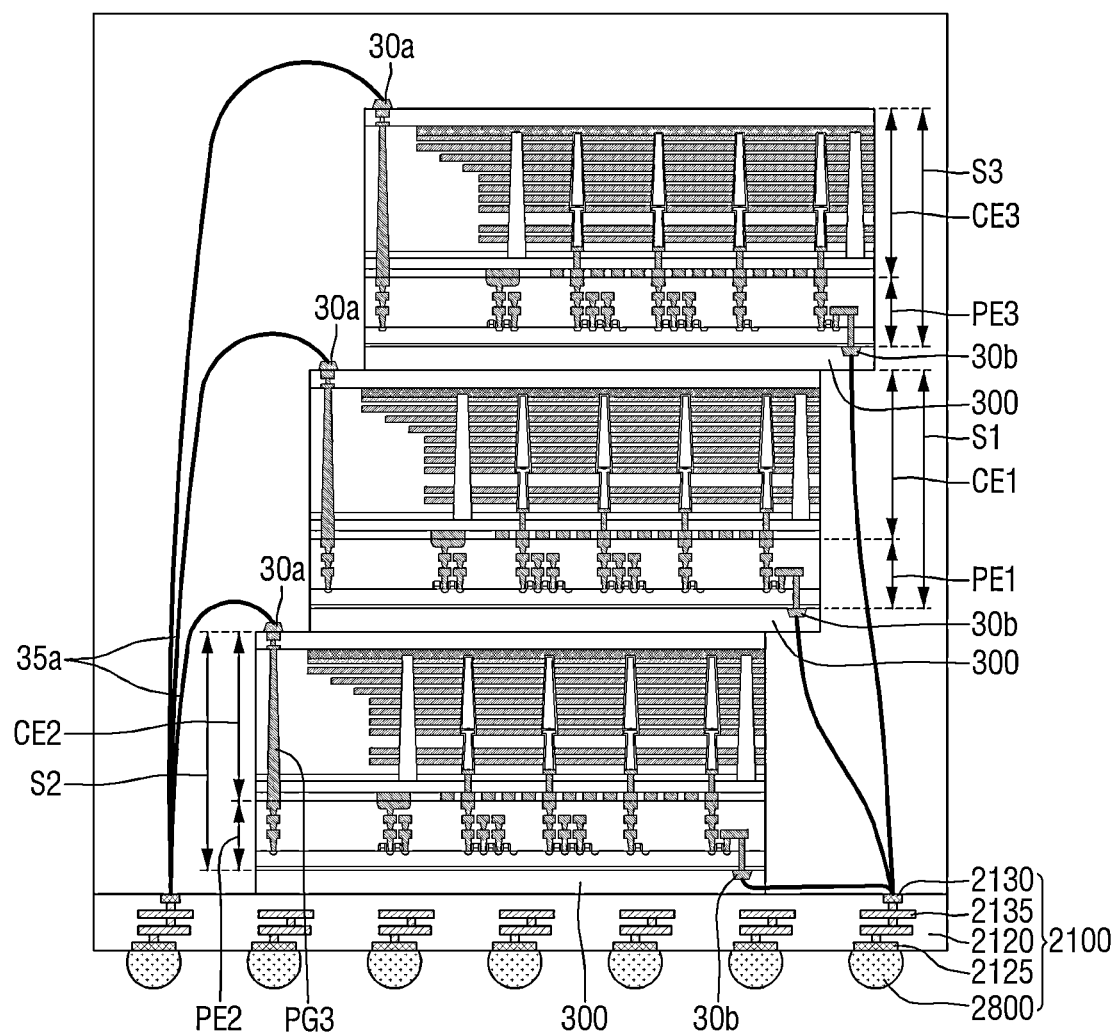
Figure 23:
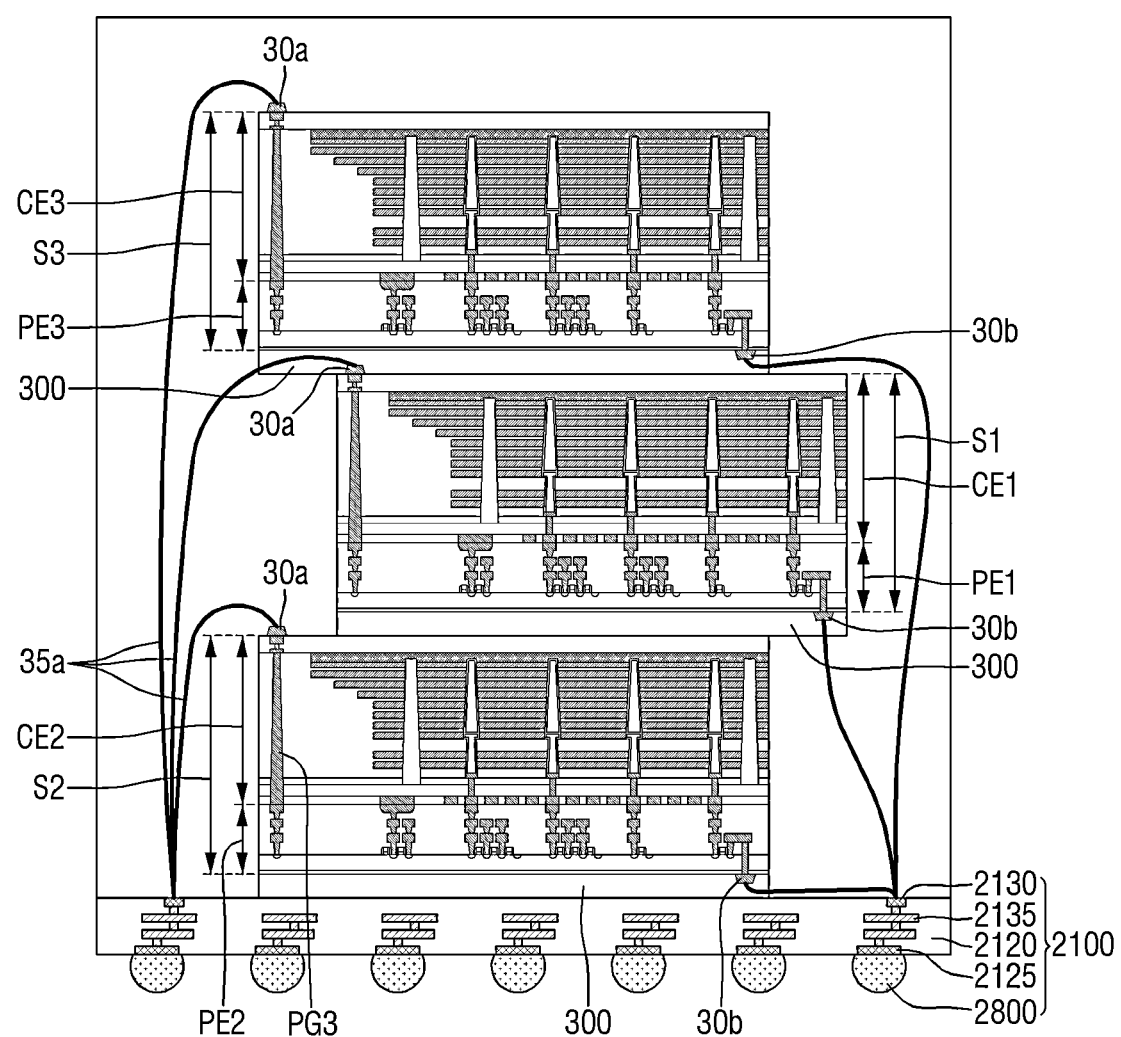

FIG. 19 is a schematic block diagram for explaining an electronic system including the semiconductor memory device according to some embodiments. FIG. 20 is a schematic perspective view for explaining the electronic system according to some embodiments. FIGS. 21 to 23 are various schematic cross-sectional views taken along I-I' of FIG. 20. For convenience of explanation, the points different from those described using FIGS. 1 to 18 will be mainly described.

Referring to FIG. 19, an electronic system 1000 according to some embodiments may include a semiconductor memory device 1100, and a controller 1200 that is electrically connected to the semiconductor memory device 1100. The electronic system 1000 may be a storage device that includes one or multiple semiconductor memory devices 1100, or an electronic device that includes the storage device. For example, the electronic system 1000 may be an SSD device (solid state drive device), a USB (Universal Serial Bus), a computing system, a medical device or a communication device that includes one or multiple semiconductor memory devices 1100.

The semiconductor memory device 1100 may be a non-volatile memory device, and for example, may be a NAND flash device explained above referring to FIGS. 1 to 18. The semiconductor memory device 1100 may include a first structure 1100F, and a second structure 1100S on the first structure 1100F.

In some embodiments, the first structure 1100F may also be placed next to the second structure 1100S. The first structure 1100F may be a peripheral circuit structure that includes a decoder circuit 1110, a page buffer 1120, and a logic circuit 1130. The second structure 1100S may be a memory cell structure that includes a bit line BL, a common source line CSL, word lines WL, first and second gate upper lines UL1 and UL2, first and second gate lower lines LL1 and LL2, and memory cell strings CSTR between the bit line BL and the common source line CSL.

In the second structure 1100S, each memory cell string CSTR may include lower transistors LT1 and LT2 adjacent to the common source line CSL, upper transistors UT1 and UT2 adjacent to the bit line BL, and a plurality of memory cell transistors MCT placed between the lower transistors LT1 and LT2 and the upper transistors UT1 and UT2. The number of lower transistors LT1 and LT2 and the number of upper transistors UT1 and UT2 may be variously changed depending on the embodiments.

In some embodiments, the upper transistors UT1 and UT2 may include a string selection transistor, and the lower transistors LT1 and LT2 may include a ground selection transistor. The gate lower lines LL1 and LL2 may each be gate electrodes of the lower transistors LT1 and LT2. The word lines WL may be gate electrodes of the memory cell transistors MCT, and the gate upper lines UL1 and UL2 may each be gate electrodes of the upper transistors UT1 and UT2.

In some embodiments, the lower transistors LT1 and LT2 may include a lower erase control transistor LT1 and a ground selection transistor LT2 connected in series. The upper transistors UT1 and UT2 may include a string selection transistor UT1 and an upper erase control transistor UT2 connected in series. At least one of the lower erase control transistor LT1 and the upper erase control transistor UT1 may be used in the erase operation for deleting the data stored in the memory cell transistor MCT by utilizing a gate induced drain leakage (GIDL) phenomenon.

The common source line CSL, the first and second gate lower lines LL1 and LL2, the word lines WL, and the first and second gate upper lines UL1 and UL2 may be electrically connected to the decoder circuit 1110 through first connection wirings 1115 that extend from the inside of the first structure 1100F to the second structure 1100S. The bit lines BL may be electrically connected to the page buffer 1120 through second connection wirings 1125 that extend from the inside of the first structure 1100F to the second structure 1100S.

In the first structure 1100F, the decoder circuit 1110 and the page buffer 1120 may execute the control operation on at least one selection memory cell transistor among the plurality of memory cell transistors MCT. The decoder circuit 1110 and the page buffer 1120 may be controlled by the logic circuits 1130. The semiconductor memory device 1100 may communicate with the controller 1200 through an I/O pad 1101 that is electrically connected to the logic circuit 1130. The I/O pad 1101 may be electrically connected to the logic circuit 1130 through an I/O connection wiring 1135 extending from the inside of the first structure 1100F to the second structure 1100S.

The controller 1200 may include a processor 1210, a NAND controller 1220, and a host interface 1230. According to embodiments, the electronic system 1000 may include a plurality of semiconductor memory devices 1100, and in this case, the controller 1200 may control the plurality of semiconductor memory devices 1100.

The processor 1210 may control the operation of the overall electronic system 1000 including the controller 1200. The processor 1210 may operate according to a desired and/or alternatively predetermined firmware, and may control the NAND controller 1220 to access the semiconductor memory device 1100. The NAND controller 1220 may include a NAND interface 1221 that processes communication with the semiconductor memory device 1100. Control command for controlling the semiconductor memory device 1100, data to be recorded in the memory cell transistors MCT of the semiconductor memory device 1100, data to be read from the memory cell transistors MCT of the semiconductor memory device 1100, and the like may be transmitted through the NAND interface 1221. The host interface 1230 may provide a communication function between the electronic system 1000 and an external host. When receiving the control command from the external host through the host interface 1230, the processor 1210 may control the semiconductor memory device 1100 in response to the control command.

Referring to FIG. 20, an electronic system 2000 according to some embodiments may include a main board 2001, a main controller 2002 mounted on the main board 2001, one or more semiconductor packages 2003, and a DRAM 2004. The semiconductor package 2003 and the DRAM 2004 may be connected to the main controller 2002 by wiring patterns 2005 formed on the main board 2001.

The main board 2001 may include a connector 2006 including a plurality of pins coupled to an external host. In the connector 2006, the number and arrangement of the plurality of pins may vary depending on the communication interface between the electronic system 2000 and the external host. In some embodiments, the electronic system 2000 may communicate with the external host according to any one of interfaces such as M-Phy for USB (Universal Serial Bus), PCI-Express (Peripheral Component Interconnect Express), SATA (Serial Advanced Technology Attachment), and UFS (Universal Flash Storage). In some embodiments, the electronic system 2000 may operate by power supplied from the external host through the connector 2006. The electronic system 2000 may further include a PMIC (Power Management Integrated Circuit) that distributes the power supplied from the external host to the main controller 2002 and the semiconductor package 2003.

The main controller 2002 may record data in the semiconductor package 2003 or read data from the semiconductor package 2003, and may improve the operating speed of the electronic system 2000.

The DRAM 2004 may be a buffer memory for relieving a speed difference between the semiconductor package 2003, which is a data storage space, and the external host. The DRAM 2004 included in the electronic system 2000 may also operate as a kind of cache memory, and may also provide a space for temporarily storing data in the control operation on the semiconductor package 2003. When the DRAM 2004 is included in the electronic system 2000, the main controller 2002 may further include a DRAM controller for controlling the DRAM 2004, in addition to a NAND controller for controlling the semiconductor package 2003.

The semiconductor package 2003 may include a first semiconductor package 2003*a* and a second semiconductor package 2003*b* that are spaced apart from each other. The first semiconductor package 2003*a* and the second semiconductor package 2003*b* may each be a semiconductor package that includes a plurality of semiconductor chips 2200.

The first semiconductor package 2003a and the second semiconductor package 2003b may each include a package substrate 2100, semiconductor chips 2200 on the package substrate 2100, connecting structures 35a and 35b for electrically connecting the semiconductor chips 2200 and the package substrate 2100, and a molding layer 2500 that covers the semiconductor chips 2200 and the connecting structures 35a and 35b on the package substrate 2100.

The package substrate 2100 may be a printed circuit board that includes upper pads 2130. Each of the semiconductor chips 2200 may include the semiconductor memory device described above using FIGS. 1 to 18.

In some embodiments, the connecting structures 35a and 35b may be bonding wires that electrically connect the semiconductor chips 2200 and the package upper pads 2130. Therefore, in each of the first semiconductor package 2003a and the second semiconductor package 2003b, the semiconductor chips 2200 may be electrically connected to each other in a bonding wire manner, and may be electrically connected to the package upper pads 2130 of the package substrate 2100.

In some embodiments, the main controller 2002 and the semiconductor chips 2200 may be included in the single package. In some embodiments, the main controller 2002 and the semiconductor chips 2200 may be mounted on a separate interposer board different from the main board 2001, and the main controller 2002 and the semiconductor chips 2200 may be connected to each other by wiring formed on the interposer board.

Referring to FIGS. 20 and 21, in the semiconductor package 2003, the package substrate 2100 may be a printed circuit board. The package substrate 2100 may include a package substrate body portion 2120, upper pads 2130 placed on an upper surface of the package substrate body portion 2120, lower pads 2125 placed on a lower surface of the package substrate body portion 2120 or exposed through the lower surface, and internal wirings 2135 that electrically connect the upper pads 2130 and the lower pads 2125 inside the package substrate body portion 2120. The upper pads 2130 may be electrically connected to the connecting structures 35a and 35b. The lower pads 2125 may be connected to the wiring patterns 2005 of the main board 2001 of the electronic system 2000 through conductive connecting portions 2800.

Each of the first and second semiconductor chips S1 and S2 may include the first and second cell structures CE1 and CE2 and the first and second peri structures PE1 and PE2, respectively. The first and second cell structures CE1 and CE2 may include, for example, the cell structure described above using FIG. 17. Unlike those shown, it goes without saying that the first and second cell structures CE1 and CE2 may be the cell structures described above using FIG. 5, or may include the cell structure described above using FIG. 18.

In some embodiments, each of the first and second semiconductor chips S1 and S2 may have first and second cell structures CE1 and CE2 and first and second peri structures PE1 and PE2 bonded in a wafer bonding manner. For example, the first and second cell structures CE1 and CE2 and the first and second peri structures PE1 and PE2 may be connected by a copper-copper (Cu to Cu) bonding process.

In some embodiments, a chip attachment film 300 may attach the semiconductor chips S1 and S2 onto the package substrate 2000. As an example, in the chip attachment film 300 may attach the second semiconductor chip S2 onto the package substrate 2100.

In some embodiments, the first semiconductor chip S1 may form an overhang region on the second semiconductor chip S2 and be stacked on the second semiconductor chip S2. For example, the stacked first semiconductor chip S1 and second semiconductor chip S2 may have a stepped shape. That is, the first semiconductor chip S1 may expose a part of the second semiconductor chip S2.

The semiconductor chips S1 and S2 may be electrically connected to each other by the connecting structures 35a and 35b, and may be electrically connected to the package upper pads 2130 of the package substrate 2100. For example, the first and second semiconductor chips S1 and S2 may be electrically connected to each other through the upper bonding wire 35a or the lower bonding wire 35b, respectively. The first and second semiconductor chips S1 and S2 may each be electrically connected to the first pad 30a and the package upper pads 2130 of the package substrate 2100, using the upper bonding wires 35a. The first and second semiconductor chips S1 and S2 may each be electrically connected to the second pad 30b and the package upper pads 2130 of the package substrate 2100, using the lower bonding wire 35b.

Referring to FIGS. 20, 22 and 23, in the electronic system 2000 according to some embodiments, each of the first to third semiconductor chips S1, S2, and S3 may be stacked, while forming an overhang region.

The third semiconductor chip S3 may be placed on the first semiconductor chip S1. The third semiconductor chip S3 may include a third cell structure CE3 and a third peri structure PE3.

As an example, as shown in FIG. 22, the first to third semiconductor chips S1, S2, and S3 may be stacked in a stepped form. As another example, as shown in FIG. 33, the first to third semiconductor chips S1, S2, and S3 may be stacked in a zigzag form.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In concluding the detailed description, those skilled in the art will appreciate that many variations and modifications may be made to the presented embodiments without substantially departing from the principles of the present disclosure. Therefore, the disclosed presented embodiments of the disclosure are used in a generic and descriptive sense only and not for purposes of limitation.

What is claimed is:
1. A semiconductor memory device comprising:
  a substrate including a first block region and a second block region; and
  a stacked structure including a plurality of inter-electrode insulating films and a plurality of gate electrodes extending in a first direction and alternately stacked on the substrate,
    the stacked structure including a vertical channel structure, a word line cut structure, and a block cut structure each penetrating the stacked structure,
    the word line cut structure extending in a second direction intersecting the first direction, the block cut structure extending in the first direction and being connected to the word line cut structure, the block cut structure defining the first block region and the second block region, the block cut structure including a first portion connected to the word line cut structure and a second portion connected to the first portion, at least a part of the first portion not overlapping the second portion in the first direction from a planar viewpoint, and at least a region of the first portion not overlapping the word line cut structure in the first direction from the planar viewpoint.

2. The semiconductor memory device of claim 1, wherein a bottom surface of the second portion of the block cut structure is higher than a bottom surface of the first portion of the block cut structure, relative to an upper surface of the substrate.

3. The semiconductor memory device of claim 1, wherein a bottom surface of the word line cut structure that does not overlap the block cut structure in the first direction is coplanar with a bottom surface of the first portion of the block cut structure.

4. The semiconductor memory device of claim 1, wherein a first surface of the first portion of the block cut structure and a second surface of the first portion of the block cut structure are opposite each other from the planar viewpoint, and the first surface of the first portion of the block cut structure and the second surface of the first portion of the block cut structure each extend in a direction intersecting the first direction and the second direction.

5. The semiconductor memory device of claim 4, wherein a width of the first portion of the block cut structure in the second direction between the first surface of the first portion of the block cut structure and the second surface of the first portion of the block cut structure is uniform between the second portion of the block cut structure and the word line cut structure.

6. The semiconductor memory device of claim 4, wherein a width in the second direction of the first portion of the block cut structure, between the first surface of the first portion of the block cut structure and the second surface of the first portion of the block cut structure, gradually decreases toward the second portion of the block cut structure from the word line cut structure.

7. The semiconductor memory device of claim 4, wherein a width in the second direction of the first portion of the block cut structure, between the first surface of the first portion of the block cut structure and the second surface of the first portion of the block cut structure, gradually increases toward the second portion of the block cut structure from the word line cut structure.

8. The semiconductor memory device of claim 1, wherein the second block region is a dummy region in which the vertical channel structure is not formed.

9. A semiconductor memory device comprising:

a substrate including a first block region and a second block region; and a stacked structure including a plurality of inter-electrode insulating films and a plurality of gate electrodes extending in a first direction and alternately stacked on the substrate, the stacked structure including a vertical channel structure, a first cut structure, and a block cut structure each penetrating the stacked structure, the first cut structure being spaced apart from the vertical channel structure, the first cut structure including a first word line cut structure and a first block cut structure, the first word line cut structure extending in a second direction intersecting the first direction, the first block cut structure extending in the first direction and being connected to the first word line cut structure, the first block cut structure defining the first block region and the second block region, and from a planar viewpoint, the first cut structure having a Y' shape in a first region in which the first word line cut structure and the first block cut structure intersect.

10. The semiconductor memory device of claim 9, wherein a bottom surface of the first cut structure in the first region is lower than the bottom surface of the first cut structure in a second region in which the first word line cut structure and the first block cut structure do not intersect each other, relative to an upper surface of the substrate.

11. The semiconductor memory device of claim 9, wherein the first block cut structure is symmetrical with respect to an axis extending in the second direction through the first word line cut structure.

12. The semiconductor memory device of claim 9, wherein in the first region, a first surface of the first block cut structure is opposite a second surface of the first block cut structure, from the planar viewpoint, and the first surface the first block cut structure and the second surface the first block cut structure each extend in a direction intersecting the first direction and the second direction.

13. The semiconductor memory device of claim 12, wherein a width in the second direction of the first block cut structure between the first surface of the first block cut structure and the second surface of the first block cut structure is constant.

14. The semiconductor memory device of claim 12, wherein a width in the second direction between the first surface of the first block cut structure and the second surface of the first block cut structure gradually increases as it goes away from the first word line cut structure.

15. The semiconductor memory device of claim 12, wherein a width in the second direction of the first block cut structure between the first surface of the first block cut structure and the second surface of the first block cut structure gradually decreases in a direction away from the first word line cut structure.

16. The semiconductor memory device of claim 9, wherein the stacked structure includes a second cut structure penetrating the stacked structure and spaced apart from the first cut structure in the first direction, the second cut structure includes a second word line cut structure and a second block cut structure, the second word line cut structure extends in the second direction, the second block cut structure extends in the first direction and is connected to the second word line cut structure, and the second cut structure has a Y' configuration in a region in which the second word line cut structure and the second block cut structure intersect from the planar viewpoint.

17. The semiconductor memory device of claim 16, wherein the first cut structure and the second cut structure are symmetrical with each other around the first direction.

18. The semiconductor memory device of claim 16, wherein the first word line cut structure and the second word line cut structure are offset in the first direction.

19. The semiconductor memory device of claim 16, wherein
the substrate further comprises a third block region, and
the second block cut structure defines the second block region and the third block region.

20. An electronic system comprising:
a main board;
a semiconductor memory device on the main board,
the semiconductor memory device including a substrate, a stacked structure, and a vertical channel structure, a word line cut structure, and a block cut structure,
the substrate including a first block region and a second block region,
the stacked structure including a plurality of inter-electrode insulating films and a plurality of gate electrodes extending in a first direction and alternately stacked on the substrate,
the vertical channel structure penetrating the stacked structure,
the word line cut structure extending in a second direction intersecting the first direction and penetrating the stacked structure,
the block cut structure extending in the first direction, penetrating the stacked structure, and being connected to the word line cut structure,
the block cut structure defining the first block region and the second block region,
the block cut structure including a first portion connected to the word line cut structure and a second portion connected to the first portion,
at least a part of the first portion not overlapping the second portion in the first direction from a planar viewpoint, and
at least a region of the first portion not overlapping the word line cut structure in the first direction from the planar viewpoint; and
a controller electrically connected to the semiconductor memory device on the main board.

* * * * *